US012763995B2

(12) United States Patent
Chou et al.

(10) Patent No.: US 12,763,995 B2
(45) Date of Patent: Oct. 13, 2026

(54) TRANSMITTER CIRCUIT WITH RINGING SUPPRESSION

(71) Applicant: AMAZING MICROELECTRONIC CORP., New Taipei City (TW)

(72) Inventors: Ting-Yi Chou, Zhubei City (TW); Che-Cheng Lee, Zhubei City (TW); Hsun-Hsiu Huang, Jhudong Township (TW)

(73) Assignee: AMAZING MICROELECTRONIC CORP., New Taipei City (TW)

( * ) Notice: Subject to any disclaimer, the term of this patent is extended or adjusted under 35 U.S.C. 154(b) by 97 days.

(21) Appl. No.: 18/904,583

(22) Filed: Oct. 2, 2024

(65) Prior Publication Data

US 2026/0095350 A1 Apr. 2, 2026

(51) Int. Cl.
*H04L 25/02* (2006.01)
*H04L 12/40* (2006.01)

(52) U.S. Cl.
CPC .... *H04L 25/0278* (2013.01); *H04L 12/40013* (2013.01); *H04L 12/40045* (2013.01); *H04L 25/0276* (2013.01); *H04L 2012/40215* (2013.01); *H04L 2012/40273* (2013.01)

(58) Field of Classification Search
CPC ........... H04L 25/0278; H04L 12/40013; H04L 12/40045; H04L 25/0276; H04L 2012/40215; H04L 2012/40273
See application file for complete search history.

(56) References Cited

U.S. PATENT DOCUMENTS 6,324,044 B1 * 11/2001 Teggatz ................ G06F 13/385 361/119
7,242,227 B2 * 7/2007 Pauletti ............... H04L 25/0284 327/170
9,495,317 B2 11/2016 Metzner et al.
11,176,070 B2 11/2021 De Haas et al.
11,310,072 B2 * 4/2022 Broughton ........ H04L 12/40013
11,539,548 B2 12/2022 Ou
(Continued)

FOREIGN PATENT DOCUMENTS

CN 110915135 B 10/2023
CN 117459343 A 1/2024
TW 201904235 A 1/2019

*Primary Examiner* — Daniel D Chang
(74) *Attorney, Agent, or Firm* — Birch, Stewart, Kolasch & Birch, LLP

(57) ABSTRACT

A transmitter circuit with ringing suppression applicable to a controller area network bus is provided, which includes a CAN bus driver stage receiving a transmit data signal and generating a CAN high voltage signal and a CAN low voltage signal, a first operational transconductance amplifier electrically connected with the CAN bus driver stage for receiving the CAN high voltage signal, and a second operational transconductance amplifier electrically connected with the CAN bus driver stage for receiving the CAN low voltage signal. A common mode voltage of a dominant state as well as a control signal are applied such that when the control signal is logically high, the first and second operational transconductance amplifiers actively pulls the CAN high voltage signal and the CAN low voltage signal to be equal to the common mode voltage of the dominant state so as to suppress ringing phenomenon occurring in the CAN bus.

52 Claims, 14 Drawing Sheets

(56) References Cited

U.S. PATENT DOCUMENTS

| | | | | |
|---|---|---|---|---|
| 2006/0091915 | A1* | 5/2006 | Pauletti | H04L 25/0284 327/108 |
| 2016/0080007 | A1 | 3/2016 | Yong et al. | |
| 2024/0187533 | A1* | 6/2024 | Chou | H04M 19/026 |

* cited by examiner

TRANSMITTER CIRCUIT WITH RINGING SUPPRESSION

BACKGROUND OF THE INVENTION

Field of the Invention

The present disclosure relates to a Controller Area Network (CAN) bus circuit. And more particularly, the present invention is related to a ringing suppression circuit which is applicable to a transmitter module in the controller area network (CAN) bus circuit for suppressing the conventional ringing phenomenon.

Description of the Prior Art

As known, Controller Area Network (CAN) is a kind of specification established in early 1990's, got standardized as ISO 11898-1 in 1993, and widely used in all kinds of vehicles and electronic devices later on. In general, the controller area network (CAN) is known as a bus standard designed to allow microcontroller units (MCU) and devices to communicate with one another in applications without a host computer. The CAN bus protocol is a message-based protocol, particularly suitable for multiplexed electrical wiring within automobiles but has usefulness in other applications.

As we know, the Controller Area Network (CAN) bus includes a serial bus, and the CAN bus is a multi-master serial bus connected on multiple nodes or station numbers in a network in order to provide high security level and efficient real time control. Also, the Controller Area Network is able to ensure debugging and priority determining mechanism, thereby making transmissions for internet messages much more reliable and efficient than ever. The existing CAN bus can be widely used in not only automotive and industrial automation applications, but also in other related fields of applications. Current CAN bus is able to support rapid data rate up to 10 Mb/s. From such a point of view, it is believed that the controller area network nowadays is not only characterized by highly flexible adjustment ability which can accommodate more nodes (station numbers) in existed internet without modifying its software and/or hardware, but also enhances network upgrading conveniences since its data transmission path do not need to build upon certain specific standard stations.

In general, a current CAN bus comes in two versions: Classic CAN and CAN FD (Flexible Data-rate). Transceiver specification for these two versions CAN have been defined in ISO 11898-2: 2016. In specific, a Classic CAN has a maximum data rate of 1 Mbps, while a CAN FD is able to reach up to 8 Mbps. However, from the point of achieving CAN FD's maximum data rate, several challenges due to issues such as: signal integrity, timing synchronization, and electromagnetic compatibility, must be overcome, in order to avoid the unwanted transmission errors generated in the transmission paths.

Among them, an unwanted oscillation of voltage or current when a signal switches states, as known as "ringing" must be considered as the CAN network's complexity increases, speeding up the transmission. And such ringing phenomenon is known and familiar, as appearing on CAN bus during CAN communication, especially when the bus status transitions from a "dominant" state to a "recessive" state. As we know, the CAN bus uses differential wired-AND signals. Two signals, CAN high (CANH) and CAN low (CANL) are either driven to a "dominant" state with CANH greater than CANL, or not driven and pulled by passive resistors to a "recessive" state with CANH less than or equal to CANL. The CAN bus signal (bus differential voltage) is then corrupted during the bus ringing, which in turn leads to communication failures. With the increasing baud rates and network size, it is believed that the ringing phenomenon becomes even less tolerable. In many cases, the CAN bus ringing becomes a stumbling block when moving towards higher speed CAN bus communication (for instance, 5 Mbits/s or even higher). As we have known, the conventional ringing phenomenon comes primarily due to impedance mismatching and network complexity. If the load impedance doesn't match with the source impedance, the unabsorbed signal energy will be reflected back, causing the ringing phenomenon. When the networks are developing with longer cable lengths, higher data rates, and rapider switching times, it is believed that the undesirable ringing phenomenon will be even getting much more serious than ever, thereby resulting in complicated network design for crucial impedance matching.

Please find accompanying FIG. 1 for references, which depicts the signal waveforms showing ringing on a CAN bus in the prior art. As illustrated in the drawings in FIG. 1, a TXD shows a transmit (TX) data signal in the CAN bus, while a RXD shows a receive (RX) data signal in the CAN bus. The Vod signal stands for the CAN bus differential voltage (VCANH−VCANL), in which VCANH is a voltage level of the CAN high signal (CANH) while VCANL is a voltage level of the CAN low signal (CANL). The VCM signal, on the other hand, stands for a common mode voltage on the CAN bus, which equals to (VCANH+VCANL)/2. In general, a stable voltage on VCM is preferred for low electromagnetic interferences (EMI) since any step or pulse transition on VCM will cause unwanted EMIs. As can be seen from FIG. 1, the CAN bus differential voltage, Vod, as (VCANH−VCANL), will be corrupted due to the bus ringing as generating in the region 911. And such ringing issue may in turn lead to communication failures in the receive data signal RXD as illustrated in the region 911 of the receive data signal RXD. As a result, with the rapid developments of the CAN bus technology nowadays as well as with the increasing baud rates and network size, it is believed necessary suppression and elimination of the conventional ringing phenomenon are thus to be expected.

As a result, it, in view of all, should be apparent and obvious that there is indeed an urgent need for the professionals in the field for a novel and inventive ringing suppression circuit to be developed, so as to solve the above-mentioned ringing issues occurring in the prior art. In addition, a maximum data rate of the CAN bus communication is desired when adopting the modified scheme.

SUMMARY OF THE INVENTION

In order to overcome the above-mentioned disadvantages, one major objective in accordance with the present invention is provided for a novel and creative circuit scheme for suppressing the conventional ringing phenomenon. The proposed circuit scheme is characterized by being applicable to a transmitter circuit in a controller area network (CAN) bus and avoiding the conventional ringing issues.

Another objective in accordance with the present invention is to provide a novel ringing suppression circuit which can be applied to a transmitter circuit which is applicable to a controller area network (CAN) bus. By employing and disposing the disclosed ringing suppression diagram in a transmitter circuit, the disclosed transmitter circuit is able to pull the bus to a recessive state and meanwhile provide enough ability to suppress the ringing phenomenon and to improve the maximum data rate at the same time.

In addition, in the following descriptions, the Applicants further provide a plurality of embodiments and variations that will be discussed later in the following paragraphs in order to verify the ringing suppression diagram and the transmitter circuit when the disclosed ringing suppression diagram is being applied to are effective. Thereby, it is worthy of full attentions that the present invention achieves to successfully solves the problems of prior arts and meanwhile maintain superior electrical properties. As a result, it is believed that the proposed technical contents of the present invention are extremely advantageous of as being highly competitive and able to be widely utilized in related IC and semiconductor industries.

Therefore, in order to achieve the above-mentioned objectives, the present invention is aimed to provide a modified circuit for ringing suppression.

According to the present invention, a modified transmitter circuit with ringing suppression, applicable to a controller area network (CAN) bus is provided.

The disclosed transmitter circuit with ringing suppression comprises a CAN bus driver stage, which receives a transmit data (TXD) signal in the CAN bus, and generates a pair of differential signals, including a CAN high voltage signal and a CAN low voltage signal; a first operational transconductance amplifier, being electrically connected with the CAN bus driver stage and receiving the CAN high voltage signal; and a second operational transconductance amplifier, being electrically connected with the CAN bus driver stage and receiving the CAN low voltage signal.

According to the technical solution of the present invention, a common mode voltage is provided to the first operational transconductance amplifier and the second operational transconductance amplifier, and a control signal (SIC_ON) is applied to the first operational transconductance amplifier and the second operational transconductance amplifier, such that when the control signal (SIC_ON) is logically high, the first operational transconductance amplifier and the second operational transconductance amplifier actively pulls the CAN high voltage signal and the CAN low voltage signal to be equal to the common mode voltage so as to suppress a ringing phenomenon occurring in the CAN bus.

According to the embodiment of the present invention, the common mode voltage is a common mode voltage of a first operating state, and the control signal (SIC_ON) is logically high when the transmit data (TXD) signal in the CAN bus transits from the first operating state to a second operating state. In one embodiment, the first operating state is a dominant state and the second operating state is a recessive state, such that the common mode voltage of the first operating state is a common mode voltage of the dominant state ($V_{CM\_DOM}$).

More specifically, according to the embodiment of the present invention, the recessive state further comprises an active recessive state, such that when the transmit data (TXD) signal in the CAN bus transits from the dominant state to the recessive state, the control signal (SIC_ON) is logically high for a period of time corresponding to the active recessive state shortly after the dominant state.

In other words, when the transmit data (TXD) signal in the CAN bus is in the active recessive state, the first operational transconductance amplifier and the second operational transconductance amplifier are turned on as the control signal (SIC_ON) transits from a low voltage level to a high voltage level following the transmit data (TXD) signal transits from the dominant state to the active recessive state. As a result, the first operational transconductance amplifier and the second operational transconductance amplifier are operable so as to pull the CAN high voltage signal and the CAN low voltage signal to the common mode voltage of the dominant state ($V_{CM\_DOM}$) and suppress the ringing phenomenon occurring in the CAN bus.

According to the technical contents of the present invention, the common mode voltage of the dominant state ($V_{CM\_DOM}$) in one embodiment, can be generated by a reference voltage generator. Alternatively, in another feasible embodiment of the present invention, then the common mode voltage of the dominant state ($V_{CM\_DOM}$) may alternatively be generated by a replica circuit of the CAN bus driver stage. Both embodiments are applicable to implement the inventive effects of the present invention. For people who are skilled in the arts and having ordinary knowledge backgrounds, adequate modifications and variations can be made according to actual circuit requirements and layout configurations. And the present invention claims the related modifications and variations based on equality.

In another aspect, regarding a detailed circuit configuration of the disclosed CAN bus driver stage, the CAN bus driver stage comprises a slew control circuit receiving the transmit data (TXD) signal, at least one first transistor which is further connected to the slew control circuit and a power supply terminal, and the at least one first transistor is serially connected with a second transistor and a first diode in cascade, outputting the CAN high voltage signa. In addition, at least one third transistor is further connected to the slew control circuit and a ground terminal, and the at least one third transistor is serially connected with a fourth transistor and a second diode in cascade, outputting the CAN low voltage signal.

According to the embodiment of the present invention, the first transistor is a P-type low-voltage (LV) Metal-oxide-semiconductor Field effect transistor (MOSFET). The second transistor is a P-type high-voltage (HV) Metal-oxide-semiconductor Field effect transistor (MOSFET). The first diode is a high-voltage (HV) diode, having an anode connected with the second transistor and a cathode connected with the first operational transconductance amplifier, outputting the CAN high voltage signal. The third transistor is an N-type low-voltage (LV) Metal-oxide-semiconductor Field effect transistor (MOSFET). The fourth transistor is an N-type high-voltage (HV) Metal-oxide-semiconductor Field effect transistor (MOSFET). The second diode is a high-voltage (HV) diode, having a cathode connected with the fourth transistor and an anode connected with the second operational transconductance amplifier, outputting the CAN low voltage signal.

According to the embodiment of the present invention, a gate terminal of the first transistor is connected with the slew control circuit, a source terminal of the first transistor is connected with the power supply terminal and a drain terminal of the first transistor is connected with the second transistor.

A gate terminal of the second transistor is connected with the ground terminal, a source terminal of the second transistor is connected with the at least one first transistor and a drain terminal of the second transistor is connected with the first diode. The first diode is a HV diode, having an anode connected with the second transistor and a cathode connected with the first operational transconductance amplifier.

A gate terminal of the third transistor is connected with the slew control circuit, a source terminal of the third transistor is connected with the ground terminal and a drain terminal of the third transistor is connected with the fourth transistor.

A gate terminal of the fourth transistor is connected with the power supply terminal, a source terminal of the fourth transistor is connected with the at least one third transistor and a drain terminal of the fourth transistor is connected with the second diode, where the second diode is a HV diode, having a cathode connected with the fourth transistor and an anode connected with the second operational transconductance amplifier and the CAN low voltage signal.

Furthermore, regarding a detailed circuit configuration of the disclosed first operational transconductance amplifier, the first operational transconductance amplifier comprises a first output stage circuit receiving the CAN high voltage signal, the first output stage circuit is successively coupled with a first switch and a second switch, and the first switch is determined to connect with a first operational amplifier by the control signal (SIC_ON), and the second switch is determined to connect with a second operational amplifier by the control signal (SIC_ON), and a replica circuit of the first output stage circuit is further electrically connected with the first operational amplifier, the second operational amplifier and a third operational amplifier, where the third operational amplifier receives a common mode voltage of a dominant state ($V_{CM\_DOM}$).

According to the embodiment of the present invention, the first operational amplifier is a negative feedback amplifier, having a positive terminal coupled with a first gate signal, and when the control signal (SIC_ON) is logically high, the first switch is operable to connect with the first operational amplifier, such that the first operational amplifier is a buffer providing the first gate signal to drive and bias the first output stage circuit. According to one embodiment of the present invention, the first gate signal can be an output signal of the third operational amplifier. Or alternatively, according to another embodiment of the present invention, then the first gate signal can be either an output signal generated by a bias circuit.

The second operational amplifier may also be a negative feedback amplifier, having a positive terminal coupled with a second gate signal, and when the control signal (SIC_ON) is logically high, the second switch is operable to connect with the second operational amplifier, such that the second operational amplifier is a buffer providing the second gate signal to drive and bias the first output stage circuit. According to one embodiment of the present invention, the second gate signal can be an output signal of the third operational amplifier. Or alternatively, according to another embodiment of the present invention, then the second gate signal may also be either an output signal generated by a bias circuit. It is believed that both implementations are applicable to implement the present invention.

On the other hand, in another aspect, when the control signal (SIC_ON) is logically low, then the first switch is coupled to a power supply terminal and the second switch is coupled to a ground terminal, instead. As a result, the first operational amplifier, the second operational amplifier, the third operational amplifier and the second output stage circuit forms an open circuit.

Furthermore, when regarding a detailed circuit configuration of the disclosed second operational transconductance amplifier, then the second operational transconductance amplifier comprises a first output stage circuit receiving the CAN low voltage signal, the first output stage circuit is successively coupled with a first switch and a second switch, and the first switch is determined to connect with a first operational amplifier by the control signal (SIC_ON), and the second switch is determined to connect with a second operational amplifier by the control signal (SIC_ON), and a second output stage circuit (a replica circuit of the first output stage circuit) is further electrically connected with the first operational amplifier, the second operational amplifier and a third operational amplifier, where the third operational amplifier receives a common mode voltage of a dominant state ($V_{CM\_DOM}$).

According to the embodiment of the present invention, the disclosed third operational amplifier has a positive terminal receiving the common mode voltage of the dominant state ($V_{CM\_DOM}$), a negative terminal coupled with a second node of the second output stage circuit, and an output terminal alternatively coupled with a positive terminal of the first operational amplifier or a positive terminal of the second operational amplifier. As a result, when the control signal (SIC_ON) is logically high in the active recessive mode, a voltage level of the first node in the first output stage circuit can be equal to a voltage level of the second node in the second output stage circuit, such that the CAN high voltage signal, the CAN low voltage signal and the common mode voltage of the dominant state ($V_{CM\_DOM}$) are equal, indicated by $VCANH=VCANL=V_{CM\_DOM}$, where VCANH stands for a voltage level of the CAN high voltage signal, and VCANL stands for a voltage level of the CAN low voltage signal.

In addition, according to the technical contents of the present invention, since a glitch of the CAN high voltage signal and the CAN low voltage signal is a main and critical factor for the transmitter circuit which affects the electromagnetic emission (EME) performances, in order to obtain a reduced glitch of the CAN high voltage signal and the CAN low voltage signal, in either of the first operational transconductance amplifier or the second operational transconductance amplifier, it is applicable to dispose a plurality of transistors, wherein each of the transistor is disposed and connected corresponding to each of the first switch and/or second switch. As a result, the plurality of the transistors are turned on sequentially according to the plurality of the first switches and/or the plurality of the second switches to be disposed so as to reduce a glitch of the CAN high voltage signal and the CAN low voltage signal for a better electromagnetic emission (EME) performance.

To be more specific, according to the detailed layout configuration of the present invention, the first operational transconductance amplifier comprises a first output stage circuit receiving the CAN high voltage signal, the first output stage circuit is successively coupled with a first switch and a second switch, and the first switch is determined to connect with a first operational amplifier by the control signal (SIC_ON), and the second switch is determined to connect with a second operational amplifier by the control signal (SIC_ON), and a second output stage circuit is further electrically connected with the first operational amplifier, the second operational amplifier and a third operational amplifier, where the third operational amplifier receives a common mode voltage of a dominant state ($V_{CM\_DOM}$).

The first output stage circuit may comprise at least one fifth transistor, a sixth transistor, a third diode, a fourth diode, a seventh transistor and at least one eighth transistor which are electrically connected in series. A first node is configured between the third diode and the fourth diode and coupled with the CAN high voltage signal, the at least one fifth transistor is electrically connected between a power supply terminal, the first switch and the sixth transistor, and the sixth transistor is electrically connected between the at least one fifth transistor, a ground terminal and the third diode. Furthermore, the seventh transistor is electrically connected between the fourth diode, the power supply terminal and the at least one eighth transistor, and the at least one eighth transistor is electrically connected between the seventh transistor, the second switch and the ground terminal.

As a result, in order to reduce a glitch of the CAN high voltage signal and the CAN low voltage signal, then the first operational transconductance amplifier may further comprises a plurality of the above mentioned fifth transistors and a plurality of the first switches, wherein each of the fifth transistors is disposed corresponding to each of the first switches, and the plurality of the fifth transistors are turned on sequentially according to the plurality of the first switches for reducing the glitch of the CAN high voltage signal and the CAN low voltage signal and providing a better EME performance.

In addition, by applying the similar technical characteristics, it may also be feasible for the first operational transconductance amplifier to further include a plurality of the above mentioned eighth transistors and a plurality of the second switches, wherein each of the eighth transistors is disposed corresponding to each of the second switches, and the plurality of the eighth transistors are turned on sequentially according to the plurality of the second switches so as to reduce a glitch of the CAN high voltage signal and the CAN low voltage signal for a better EME performance.

In addition, by applying the similar technical characteristics, it may also be feasible for the CAN bus driver stage to further include a plurality of transistors which are connected in cascade, and the plurality of the transistors are electrically connected with the slew control circuit such that the plurality of the transistors are sequentially turned on by the slew control circuit so as to reduce a glitch of the CAN high voltage signal and the CAN low voltage signal that may affect electromagnetic emission directly and on the other hand, derive a better electromagnetic emission (EME) performance.

However, what draws our attention is that, the present invention is not limited thereto such embodiments as proposed herein the present invention. In other words, for people who are skilled in the art and having ordinary understandings and technical backgrounds to the present invention, it would be allowed for them to make various modifications or changes depending on different circuit regulations /d/ or specifications without departing from the scope of the invention. That is to say, the present invention is certainly not limited thereto. And the variant embodiments and/or circuit implementations should still fall into the claim scope of the present invention.

In general, those skilled in the art and having general knowledge are able to make appropriate modifications or variations with respective to the technical contents disclosed in the present invention without departing from the spirits of the present invention. The present invention is certainly not restricted by the certain limited configurations and/or circuit diagrams disclosed in the embodiments of the present invention. As such, it is believed that the modifications or variations should still fall into the scope of the present invention, and the present invention covers the modifications and variations.

In another aspect, when the proposed ringing suppression circuit of the present invention is applied to the transmitter module in a controller area network, the CAN high signal (CANH) and the CAN low signal (CANL) are able to be further transmitted and received by a receiver module of the controller area network, such that the receiver module outputs a receive (RX) data signal without generating bit errors.

Moreover, in order to be more economical and in order to achieve the objectives of saving more circuit layout area and reducing area consumption, then the first operational transconductance amplifier of the present invention may also be able to share certain transistor and/or diode components with the CAN bus driver stage. In addition, the second operational transconductance amplifier may also be able to share certain transistor and/or diode components with the CAN bus driver stage. And alternatively, the first operational transconductance amplifier as well as the second operational transconductance amplifier may additionally share the replica circuit of the output stage and the third operational amplifier as well. As a result, by employing the technical contents as disclosed in the above sections of the present invention, it is believed that the present invention may further achieve in the superior inventive effects for circuit layout consumption reduction.

To sum up, it is believed that for people who are skilled in the art and having ordinary understandings and technical backgrounds to the present invention, various modifications and/or variation embodiments depending on different circuit regulations and/or specifications without departing from the scope of the invention are practicable and to be expected. That is to say, the present invention is certainly not limited thereto. And the variant embodiments and/or circuit implementations should still fall into the claim scope of the present invention.

As a result, based on the disclosed technical features illustrated as above, it is evident that the present invention is sophisticatedly designed and indeed discloses a novel modified scheme for ringing suppression. As the Applicants have described earlier in the Description of the Prior Art, since a ringing phenomenon is generally generated by the reflections of communication voltage wave, which occur because of impedance mismatches in a controller area network at the signal transition frequencies, and the impedance mismatches occur mainly at not-terminated nodes and the junction, which lead to unfavorable mass production, the present invention is thus provided and aimed to solve such drawbacks by proposing a novel and inventive ringing suppression circuit structure. The Applicants of the Application, as a result, propose a novel and modified transmitter circuit which is applicable to a controller area network (CAN) bus. The proposed transmitter circuit is a whole new transmitter architecture which meets the requirement of SIC mode in ISO 11898-2: 2024. According to the technical solution of the present invention, it generally adopts two operational transconductance amplifiers (OTAs) which will be used therein the transmitter circuit structure in order to improve the impedance matching while a pair of differential signals change to a recessive state from a dominant state on the CAN bus.

By employing the present invention, it is believed that the present invention achieves in effectively both suppressing the conventional ringing issue and improving the maximum data rate of the controller area network bus. The proposed transmitter circuit with ringing suppression is thus inventive and is highly efficient since circuit complexity for implementing the proposed ringing suppression circuit is relatively low.

As a result, it is believed that the proposed ringing suppression circuit diagram and the transmitter circuit in which the ringing suppression circuit diagram is being applied to and disclosed by the present invention, are beneficial in view of a great number of merits. Thus, it is believed that the present invention is extremely advantageous while compared to the prior arts.

These and other objectives of the present invention will become obvious to those of ordinary skill in the art after reading the following detailed description of preferred embodiments.

It is to be understood that both the foregoing general description and the following detailed description are exemplary and are intended to provide further explanation of the invention as claimed.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
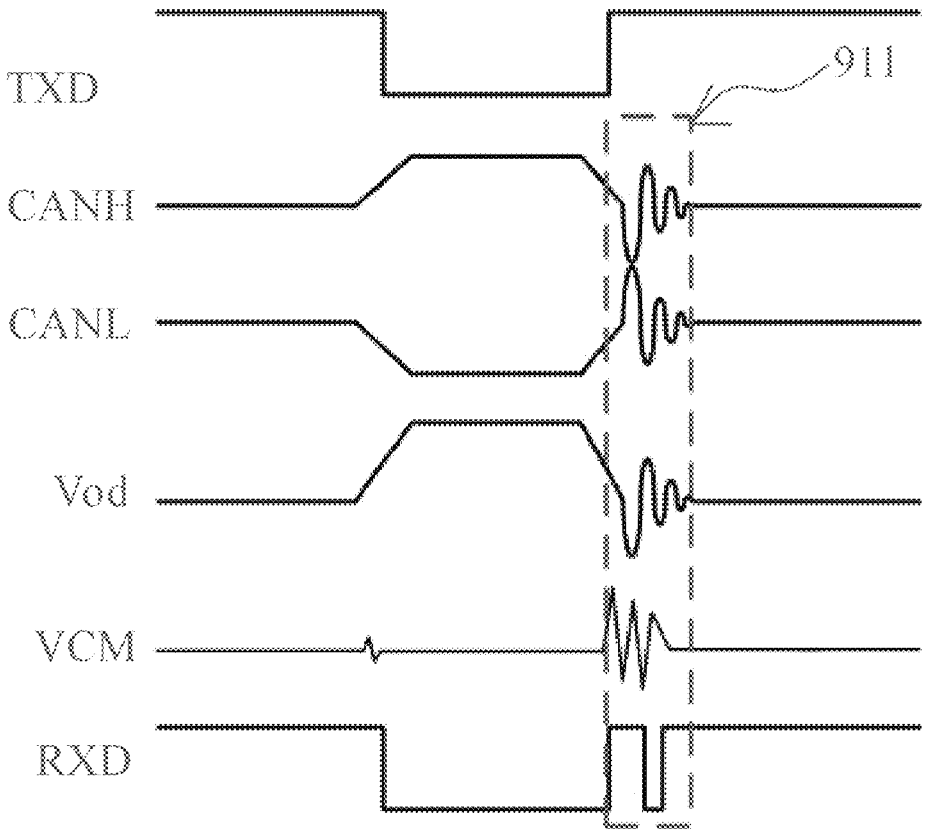
Fig. 1 (prior art)
FIG. 1 depicts a plurality of signal waveforms showing the conventional ringing issue on a CAN bus in the prior art, including a transmit (TX) data signal, a CAN high voltage signal, a CAN low voltage signal, a CAN bus differential voltage signal, a common mode voltage signal, and a receive (RX) data signal of the CAN bus.

Reference will now be made in detail to the preferred embodiments of the present invention, examples of which are illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

The embodiments described below are illustrated to demonstrate the technical contents and characteristics of the present invention and to enable the persons skilled in the art to understand, make, and use the present invention. However, it shall be noticed that it is not intended to limit the scope of the present invention. Therefore, any equivalent modification or variation according to the spirit of the present invention is to be also included within the scope of the present invention.

Unless otherwise specified, some conditional sentences or words, such as "can", "could", "might", or "may", usually attempt to express that the embodiment in the invention has, but it can also be interpreted as a feature, element, or step that may not be needed. In other embodiments, these features, elements, or steps may not be required. Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled to," "couples to," and "coupling to" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The invention is particularly described with the following examples which are only for instance. Those skilled in the art will readily observe that numerous modifications and alterations of the device and method may be made while retaining the teachings of the invention. Accordingly, the following disclosure should be construed as limited only by the metes and bounds of the appended claims. In the whole patent application and the claims, except for clearly described content, the meaning of the article "a" and "the" includes the meaning of "one or at least one" of the element or component. Moreover, in the whole patent application and the claims, except that the plurality can be excluded obviously according to the context, the singular articles also contain the description for the plurality of elements or components. In the entire specification and claims, unless the contents clearly specify the meaning of some terms, the meaning of the article "wherein" includes the meaning of the articles "wherein" and "whereon". The meanings of every term used in the present claims and specification refer to a usual meaning known to one skilled in the art unless the meaning is additionally annotated. Some terms used to describe the invention will be discussed to guide practitioners about the invention. Every example in the present specification cannot limit the claimed scope of the invention.

The terms "substantially," "around," "about" and "approximately" can refer to within 20% of a given value or range, and preferably within 10%. Besides, the quantities provided herein can be approximate ones and can be described with the aforementioned terms if are without being specified. When a quantity, density, or other parameters includes a specified range, preferable range or listed ideal values, their values can be viewed as any number within the given range.

As the Applicants have described earlier in the Description of the Prior Art, since a ringing phenomenon is generally generated by the reflections of communication voltage wave, which occur because of impedance mismatches in a controller area network at the signal transition frequencies, and the impedance mismatches occur mainly at not-terminated nodes and the junction, which lead to unfavorable mass production, the present invention is thus provided and aimed to solve such drawbacks by proposing a novel and inventive ringing suppression circuit structure. The Applicants of the Application, as a result, propose a novel and modified transmitter circuit which is applicable to a controller area network (CAN) bus. The proposed transmitter circuit is a whole new transmitter architecture which meets the requirement of SIC mode in ISO 11898-2: 2024. According to the technical solution of the present invention, two operational transconductance amplifiers (OTAs) are used therein the transmitter circuit structure in order to improve the impedance matching while a pair of differential signals change to a recessive state from a dominant state on the CAN bus.

Apart from the above, the electromagnetic interferences (EMI) performance could also be enhanced by the disclosed operational transconductance amplifiers since the common mode voltage on the CAN bus is well controlled while the dominant-to-recessive transition occurs. By employing such modification and improvements, it is believed that the provided transmitter circuit with ringing suppression is advantageous of showing extraordinary ringing suppression efficiency, while compared with the prior arts. In the following paragraphs, the disclosed transmitter circuit with ringing suppression will now be provided and illustrated by a plurality of variant embodiments as described in the following sections for your references.

Overall, the present invention is aimed to disclose a transmitter circuit with ringing suppression which is applicable to a controller area network bus, which will be now provided in the following descriptions. The proposed transmitter circuit with ringing suppression includes a CAN bus driver stage receiving a transmit data signal and generating a CAN high voltage signal and a CAN low voltage signal. A first operational transconductance amplifier is electrically connected with the CAN bus driver stage for receiving the CAN high voltage signal, and a second operational transconductance amplifier is electrically connected with the CAN bus driver stage for receiving the CAN low voltage signal. A common mode voltage of a dominant state as well as a control signal are designed and applied such that when the control signal is logically high, the first operational transconductance amplifier and the second operational transconductance amplifier are able to actively pull the CAN high voltage signal and the CAN low voltage signal to be equal to the common mode voltage of the dominant state so as to suppress ringing phenomenon occurring in the CAN bus.

Figure 2:
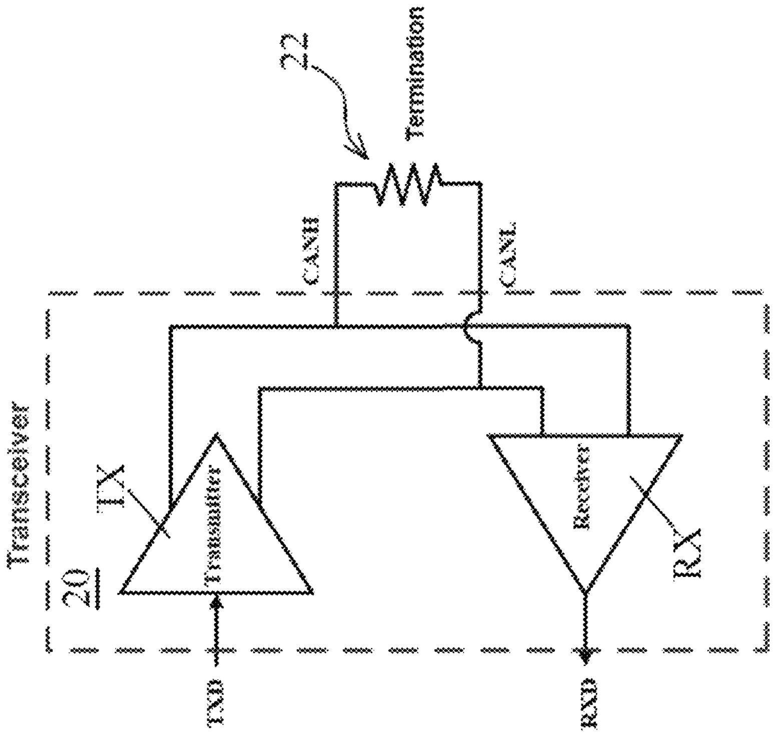
FIG. 2 schematically shows an illustrative diagram of a typical transceiver structure in accordance with one embodiment of the present invention.

To be specific, in order to provide more detailed technical descriptions and for clear references, please refer FIG. 2 at first, in which FIG. 2 schematically shows an illustrative diagram of a typical transceiver structure in accordance with one embodiment of the present invention. As shown in FIG. 2, the transceiver 20 includes a transmitter circuit TX and a receiver circuit RX. A transmit (TX) data signal TXD is a digital signal from a microcontroller, which is sent to the CAN transceiver 20 and received by the transmitter circuit TX. After that, a pair of differential signals, including a CAN high voltage signal CANH and a CAN low voltage signal CANL are generated and received by the receiver circuit RX. A receive (RX) data signal RXD is then transmitted to a microcontroller by the receiver circuit RX of the CAN transceiver 20. And a termination resistor 22 disposed on the CAN bus is coupled between the CAN high voltage signal CANH and the CAN low voltage signal CANL. According to one feasible embodiment of the present invention, the termination resistor 22 may be preferably, a resistor having a resistance of 60 ohms (Ω).

As the Applicants of the invention have discussed in the prior arts, and as illustrated in the region 911 of the signal drawings in FIG. 1, in order to suppress and avoid the ringing phenomenon occurring on the CAN bus, the present invention is proposing a novel transmitter circuit, which is characterized by ringing suppression with low electromagnetic emission. Please refer to FIG. 3, which schematically shows a layout structural diagram of a proposed transmitter circuit with ringing suppression in accordance with a main embodiment of the present invention. The proposed transmitter circuit 300 is applicable to a controller area network (CAN) bus and thus achieves in effectively suppressing the conventional ringing phenomenon generating on the CAN bus.

Figure 3:
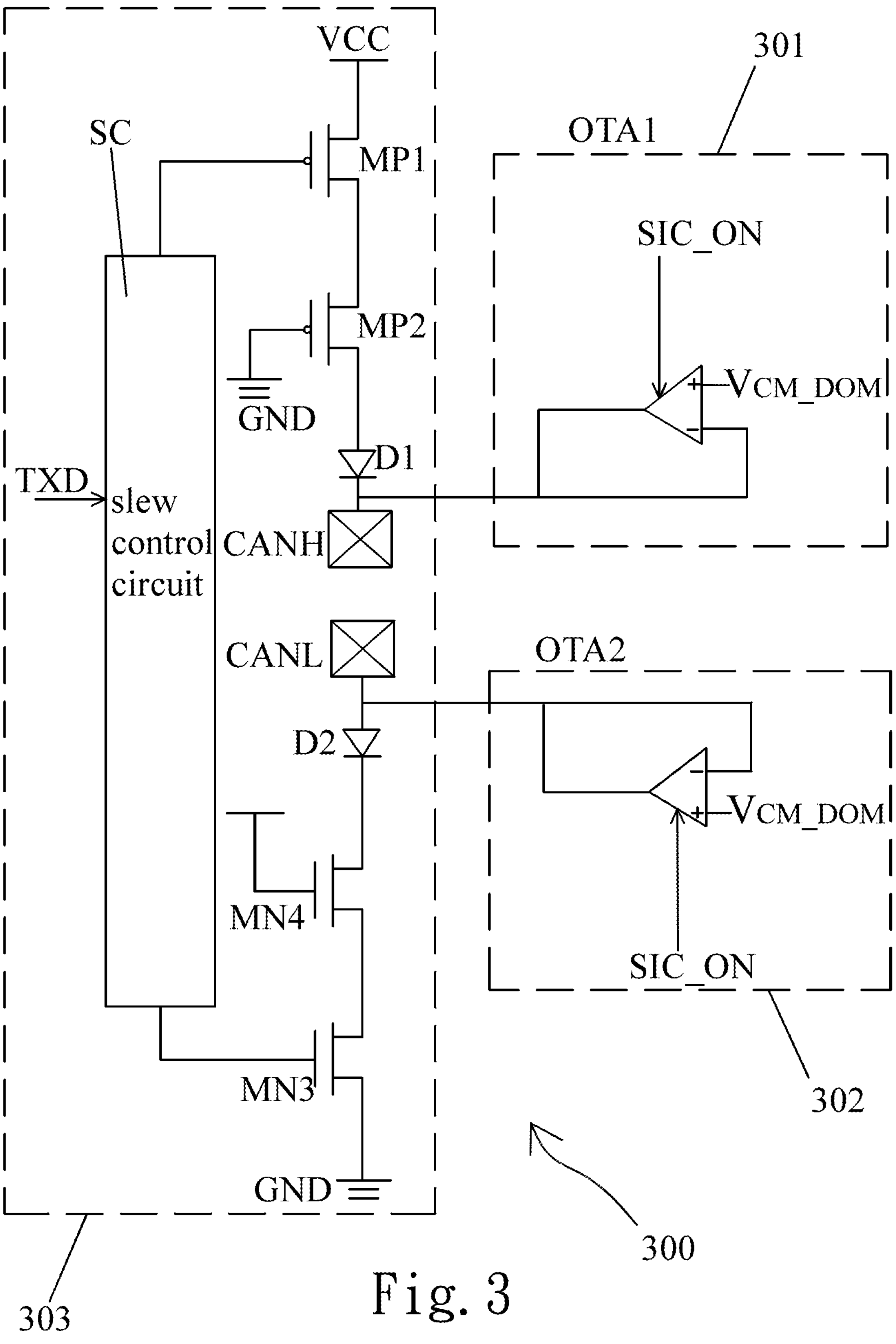
FIG. 3 schematically shows a layout structural diagram of a proposed transmitter circuit with ringing suppression in accordance with a main embodiment of the present invention.

According to one main embodiment of the present invention, the disclosed transmitter circuit 300 includes a first operational transconductance amplifier (OTA1) 301, a second operational transconductance amplifier (OTA2) 302, as well as a CAN bus driver stage 303. As can be seen in the drawing of FIG. 3, the CAN bus driver stage 303 is operable to receive the transmit data signal TXD in the CAN bus and accordingly generate a pair of differential signals, including a CAN high voltage signal CANH and a CAN low voltage signal CANL.

Figure 4:
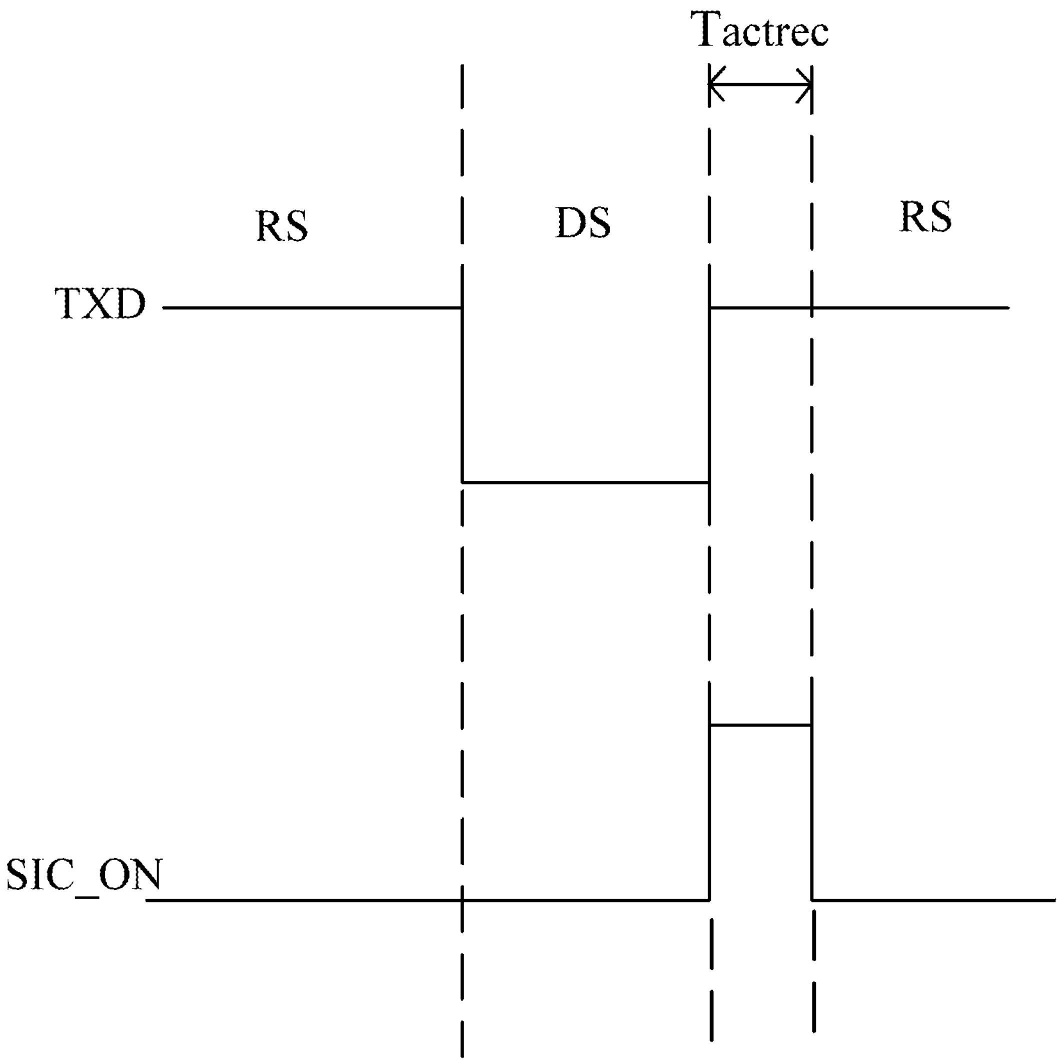
FIG. 4 schematically shows an illustrative drawing of signal waveforms of the transmit data signal TXD and the control signal SIC_ON, showing that how the disclosed control signal SIC_ON is operated in the present invention in order to achieve in ringing suppression.

The first operational transconductance amplifier 301 is disposed as being electrically connected with the CAN bus driver stage 303 and receiving the CAN high voltage signal CANH. Similarly, the second operational transconductance amplifier 302 is disposed as being electrically connected with the CAN bus driver stage 303 as well and receiving the CAN low voltage signal CANL. According to the technical contents of the present invention, the present invention is proposed to use two operational transconductance amplifiers 301 and 302, accompanied by a control signal SIC_ON so as to solve the ringing phenomenon. Please refer to FIG. 4 at the same time, in which FIG. 4 schematically shows an illustrative drawing of signal waveforms of the transmit data signal TXD and the control signal SIC_ON, showing that how the disclosed control signal SIC_ON is operated in the present invention in order to achieve in ringing suppression.

As we can see, after the transceiver transmits from a dominant state DS to a recessive state RS, the recessive state RS further comprises a short period of operating state, which is an active recessive state $T_{actrec}$, and the control signal SIC_ON is logically high for a period of time corresponding to the active recessive state $T_{actrec}$ shortly after the dominant state DS. During the active recessive state $T_{actrec}$, the first operational transconductance amplifier 301 and the second operational transconductance amplifier 302 are operable to actively pull the CAN high voltage signal CANH and the CAN low voltage signal CANL to the voltage which equals to the bus common mode voltage of the dominant state ($V_{CM\_DOM}$) for a period (referred to as the active recessive state $T_{actrec}$). And the output current of the first operational transconductance amplifier 301 will be proportional to the difference between the voltage of the CAN high voltage signal CANH and the bus common mode voltage of the dominant state ($V_{CM\_DOM}$). And the output current of the second operational transconductance amplifier 302 will be proportional to the difference between the voltage of the CAN low voltage signal CANL and the bus common mode voltage of the dominant state ($V_{CM\_DOM}$). In one embodiment, a low impedance (37.5 ohm□66.5 ohm which is defined in ISO11898-2:2024) can be accomplished. As a result, it is believed that the low impedance not only suppresses the occurrence of a conventional ringing phenomenon, but also provides the voltage of the CAN high voltage signal CANH and the CAN low voltage signal CANL to the common mode voltage of the dominant state ($V_{CM\_DOM}$) for a stable common mode voltage so as to improve the electromagnetic emission (EME) level during a dominant state to a recessive state transmission. To sum above, it is apparent that, the present invention employs to provide a common mode voltage of the dominant state ($V_{CM\_DOM}$) both to the first operational transconductance amplifier 301 and the second operational transconductance amplifier 302, and by the control signal SIC_ON turning logically high in the active recessive state $T_{actrec}$, the first operational transconductance amplifier 301 and the second operational transconductance amplifier 302 are able to actively pull the CAN high voltage signal CANH and the CAN low voltage signal CANL to be equal to the common mode voltage of the dominant state $V_{CM\_DOM}$ such that the undesirable ringing phenomenon occurring in the CAN bus can be effectively and significantly suppressed and avoided.

Figure 5:
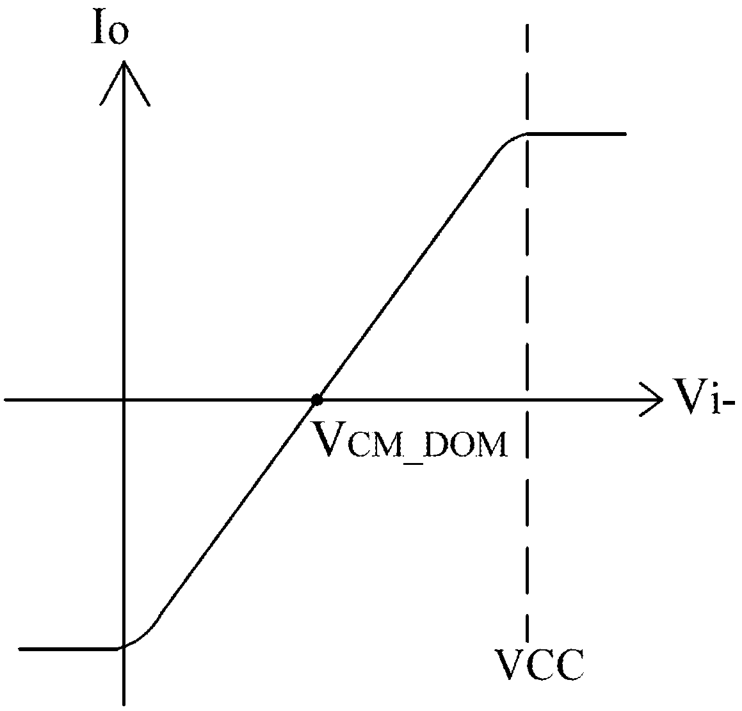
FIG. 5 schematically shows an illustrative curve drawing diagram of $I_o$ versus $V_{i\_}$ signal waveforms of the OTAs, wherein $V_{i\_}$ is the voltage signal of the negative terminal of the OTAs (the first operational transconductance amplifier and the second operational transconductance amplifier), and $I_o$ is an output current of the OTAs (the first operational transconductance amplifier and the second operational transconductance amplifier).

In general, the control signal SIC_ON is a certain kind of signal improvement capability (SIC) signal generated for controlling whether and when the first operational transconductance amplifier 301 and the second operational transconductance amplifier 302 start to work by the TXD signal from the controller to the transceiver. When the TXD signal is detected to change from a low voltage level to a high voltage level, in other words, from a dominant state DS to a recessive state RS (see FIG. 4), then the first operational transconductance amplifier 301 and the second operational transconductance amplifier 302 are turned on at this time to actively bias the voltage on both the CAN high voltage signal CANH and the CAN low voltage signal CANL to be as same as the bus common mode voltage of the dominant state ($V_{CM\_DOM}$). Such interval that both the first operational transconductance amplifier 301 and the second operational transconductance amplifier 302 work is the active recessive state $T_{actrec}$, that is, the bus common mode voltage of the active recessive state will be equal to $V_{CM\_DOM}$. Please find FIG. 5 for accompanying references, in which FIG. 5 schematically shows an illustrative drawing of signal waveforms of the OTAs $I_o/V_{i-}$ curve diagram, wherein $V_{i-}$ is the voltage signal of the negative terminal of the OTA (first operational transconductance amplifier 301 and the second operational transconductance amplifier 302), and $I_o$ is an output current of the OTA (first operational transconductance amplifier 301 and the second operational transconductance amplifier 302). As can be seen in such waveform drawing of FIG. 5, it is illustrated and believed that when $V_{i-}=V_{CM\_DOM}$, the output current $I_o$ of the OTAs (including the first operational transconductance amplifier 301 and the second operational transconductance amplifier 302) is zero, controlling "the CAN high voltage signal CANH"="the CAN low voltage signal CANL"="the bus common mode voltage of the dominant state $V_{CM\_DOM}$".

Furthermore, regarding a detailed circuit configuration of the proposed invention, please refer to the CAN bus driver stage 303 in FIG. 3 first. As can be seen, the CAN bus driver stage 303 of the disclosed transmitter circuit includes a slew control circuit SC receiving the transmit data signal TXD, at least one first transistor MP1, a second transistor MP2, at least one third transistor MN3, a fourth transistor MN4, as well as a first diode D1 and a second diode D2. According to the main embodiment of the present invention, the slew control circuit SC is operable to receive a transmit data signal TXD. The at least one first transistor MP1 is further connected to the slew control circuit SC and a power supply terminal VCC. After that, the at least one first transistor MP1 is then serially connected with the second transistor MP2 and the first diode D1 in cascade, outputting the CAN high voltage signal CANH. In another aspect, the at least one third transistor MN3 is further connected to the slew control circuit SC and a ground terminal GND, and the at least one third transistor MN3 is serially connected with the fourth transistor MN4 and the second diode D2 in cascade, outputting the CAN low voltage signal CANL.

According to the embodiment of the present invention, the at least one first transistor MP1 is a P-type low-voltage (LV) Metal-oxide-semiconductor Field effect transistor (MOSFET), having a gate terminal connected with the slew control circuit SC, a source terminal connected with the power supply terminal VCC and a drain terminal connected with the second transistor MP2.

The second transistor MP2 is a P-type high-voltage (HV) Metal-oxide-semiconductor Field effect transistor (MOSFET), having a gate terminal connected with the ground terminal GND, a source terminal connected with the at least one first transistor MP1 and a drain terminal connected with the first diode D1. And, the first diode D1 is a high-voltage (HV) diode, having an anode connected with the second transistor MP2 and a cathode connected with the negative and output terminals of the first operational transconductance amplifier 301, outputting the CAN high voltage signal CANH.

On the other hand, the at least one third transistor MN3 is an N-type low-voltage (LV) Metal-oxide-semiconductor Field effect transistor (MOSFET), having a gate terminal connected with the slew control circuit SC, a source terminal connected with the ground terminal GND and a drain terminal connected with the fourth transistor MN4.

The fourth transistor MN4 is an N-type high-voltage (HV) Metal-oxide-semiconductor Field effect transistor (MOSFET), having a gate terminal connected with the power supply terminal VCC, a source terminal connected with the at least one third transistor MN3 and a drain terminal connected with the second diode D2. And the second diode D2 is a high-voltage (HV) diode, having a cathode connected with the fourth transistor MN4 and an anode connected with the negative and output terminals of the second operational transconductance amplifier 302, outputting the CAN low voltage signal CANL.

Regarding a detailed operation of the present invention, when in a dominant state (the transmit data signal TXD=0), the at least one first transistor MP1 and the at least one third transistor MN3 in the transmitter circuit will be turned on to pull the CAN high voltage signal CANH up to a high voltage level (for instance, 3.5V) and pull the CAN low voltage signal CANL down to a low voltage level (for instance, 1.5V). At this time, the OTAs (the first operational transconductance amplifier 301 and the second operational transconductance amplifier 302) will be turned off at the dominant state.

After that, when the transmit data signal TXD makes a transition from "0" to "1" (logically low to high), then the at least one first transistor MP1 and the at least one third transistor MN3 in the transmitter circuit will be turned off, and the OTAs (the first operational transconductance amplifier 301 and the second operational transconductance amplifier 302) will be turned on instead, so as to pull the voltages of both the CAN high voltage signal CANH and the CAN low voltage signal CANL to the common mode voltage of dominant state (which is the $V_{CM\_DOM}$) for a short period of time interval, as described earlier which is the active recessive state $T_{actrec}$. According to a practicable embodiment of the present invention, such time interval of the active recessive state $T_{actrec}$ defined in ISO 11898-2: 2024 can be for example, between 355 nanoseconds (ns) to 530 nanoseconds after the transmit data signal TXD transits from "0" to "1".

And then, after end of the active recessive state $T_{actrec}$, the OTAs (the first operational transconductance amplifier 301 and the second operational transconductance amplifier 302) will be turned off again, so as to enter the recessive state until the transmit data signal TXD transits to "0" and enters in a dominate state again.

According to some variant embodiment of the present invention, the present invention is not limited by the number of first transistor MP1 and third transistor MN3 disposed in the transmitter circuit. In other words, in some other variant embodiments of the present invention, it may be also applicable to dispose a plurality of first transistors MP1 in the transmitter circuit. According to such an alternative configuration, the plurality of first transistors MP1 are disposed as being electrically connected in cascade. And the plurality of first transistors MP1 are electrically connected with the slew control circuit SC such that the plurality of first transistors MP1 can be sequentially turned on by the slew control circuit SC, for a purpose of further reducing a glitch of the CAN high voltage signal CANH and the CAN low voltage signal CANL. In other words, according to the present invention, the slew control circuit SC can be used to control the turn on and turn off sequence of the plurality of first transistors MP1 when multiple first transistors MP1 are disposed for a lower glitch of the CAN high voltage signal CANH and the CAN low voltage signal CANL as well as the signal slew rate on both CAN high voltage signal CANH and CAN low voltage signal CANL, since this is necessary for achieving in low electromagnetic emission (EME).

As a result, by applying the same manners, it is believed that the CAN bus driver stage 303 may also further comprise a plurality of the third transistors MN3 which are connected in cascade, and the plurality of the third transistors MN3 are electrically connected with the slew control circuit SC such that the plurality of the third transistors MN3 can also be sequentially turned on by the slew control circuit SC, so as to reduce a glitch of the CAN high voltage signal CANH and the CAN low voltage signal CANL. By employing the disclosed technical contents, it is believed that an even significantly low EME efficiency can be implemented and achieved by employing the variant embodiments of the present invention when a plurality of first transistor MP1 and/or a plurality of third transistors MN3 are adopted in the disclosed transmitter circuit structure. And the present invention, without doubts, indeed covers these modifications and its equality based on the disclosed technical spirits of the present invention for sure.

Figure 6:
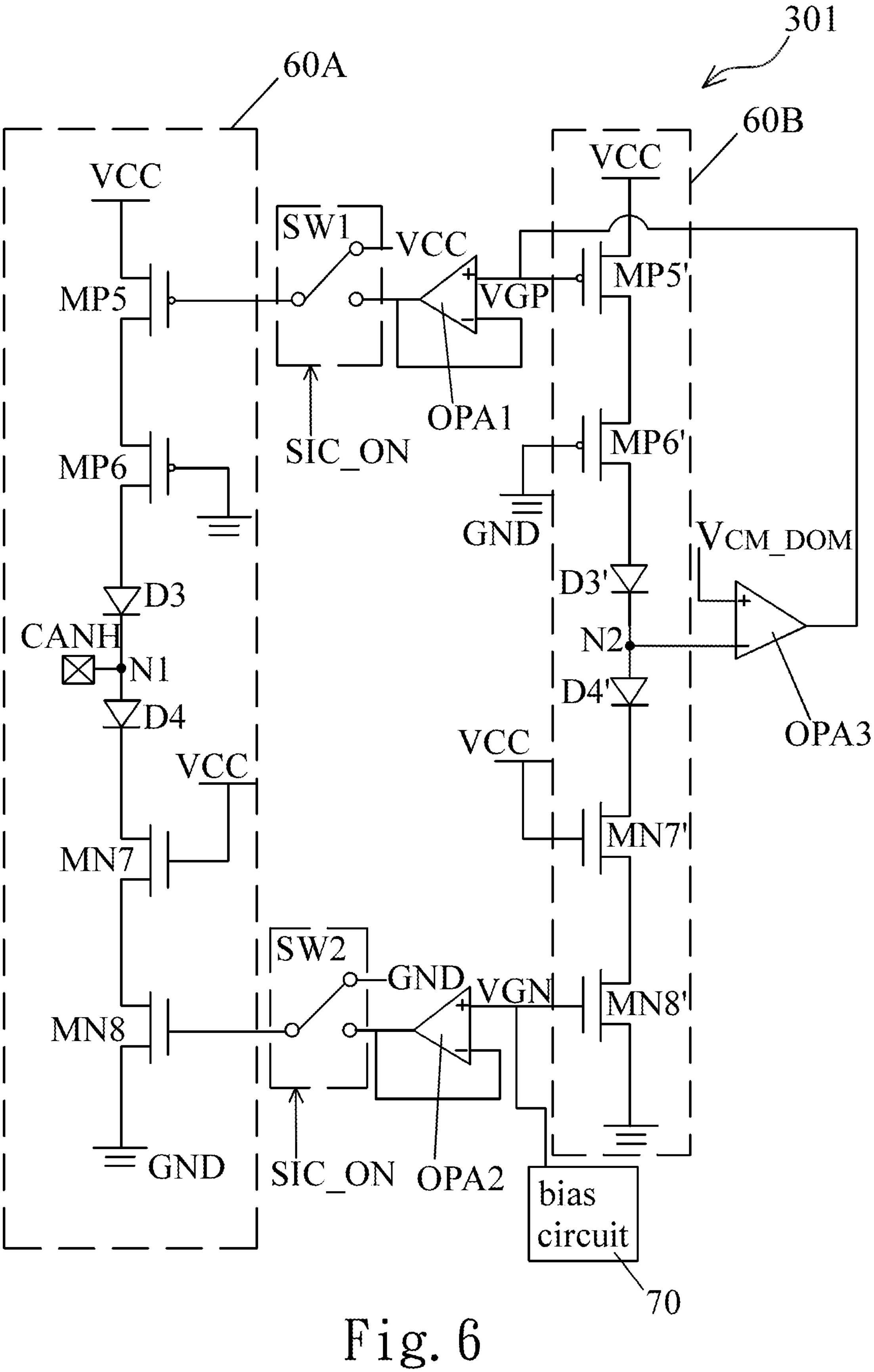
FIG. 6 schematically shows a layout structural diagram of the first operational transconductance amplifier (OTA1) of the disclosed transmitter circuit with ringing suppression in accordance with one embodiment of the present invention, when the first switch is electrically coupled to the power supply terminal VCC, and the second switch is electrically coupled to the ground terminal GND, and the first gate signal VGP is an output signal of the third operational amplifier while the second gate signal VGN is an output signal generated by a bias circuit.

And successively, please refer to FIG. 6, which schematically shows a layout structural diagram of the first operational transconductance amplifier (OTA1) 301 of the disclosed transmitter circuit with ringing suppression in accordance with one embodiment of the present invention. As can be seen in FIG. 6, the first operational transconductance amplifier 301 comprises a first output stage circuit 60A receiving the CAN high voltage signal CANH. And the first output stage circuit 60A is successively coupled with a first switch SW1 and a second switch SW2. According to the embodiment of the present invention, it is designed that, the first switch SW1 can be determined to alternatively connect with a first operational amplifier OPA1 or with a power supply terminal VCC, which is controlled and decided by the applied control signal SIC_ON. Similarly, the second switch SW2 can be determined to alternatively connect with a second operational amplifier OPA2 or with a ground terminal GND, which is controlled and decided by the control signal SIC_ON as well.

And furthermore, a second output stage circuit 60B is then further electrically connected with the first operational amplifier OPA1, the second operational amplifier OPA2 and a third operational amplifier OPA3, where the third operational amplifier OPA3 is adapted to receive the common mode voltage of the dominant state $V_{CM\_DOM}$.

According to the embodiment of the present invention, specifically, when the control signal SIC_ON is logically low, then it is determined that the first switch SW1 is coupled to the power supply terminal VCC, and the second switch SW2 is coupled to the ground terminal GND (see FIG. 6). Under such an operating condition, then the first operational amplifier OPA1, the second operational amplifier OPA2, the third operational amplifier OPA3, and the second output stage circuit 60B forms an open circuit.

Figure 7:
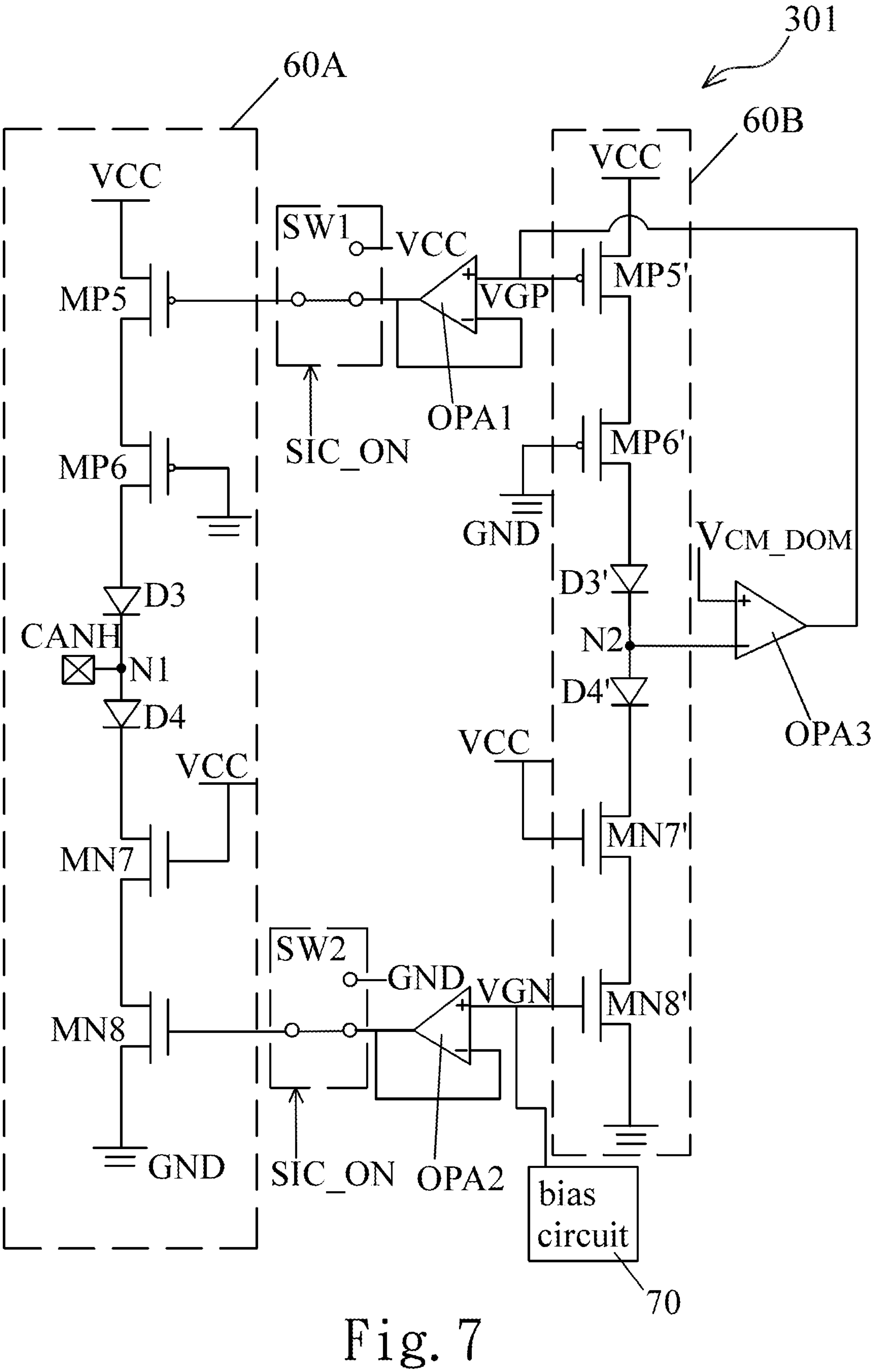
FIG. 7 schematically shows a layout structural diagram of the first operational transconductance amplifier (OTA1) of the disclosed transmitter circuit with ringing suppression in accordance with one embodiment of the present invention, when the first switch is electrically coupled to the first operational amplifier, and the second switch is electrically coupled to the second operational amplifier, and the first gate signal VGP is an output signal of the third operational amplifier while the second gate signal VGN is an output signal generated by a bias circuit.

On the other hand, please refer to FIG. 7, which schematically shows another layout structural diagram of the first operational transconductance amplifier (OTA1) 301 of the disclosed transmitter circuit with ringing suppression according to FIG. 6, while the control signal SIC_ON is logically high. As the Applicants of the present invention have disclosed earlier in the previous sections, when the transmit data signal TXD transits from the dominant state to the recessive state, as in the active recessive state $T_{actrec}$, then in such an operating condition, the control signal SIC_ON begins to transit from a low voltage level to a high voltage level (turning logically high), and the first switch SW1 is operable to connect with the first operational amplifier OPA1 instead, such that the first operational amplifier OPA1 is a buffer providing a first gate signal VGP to drive and bias the first output stage circuit 60A. As can be seen, the first operational amplifier OPA1 is configured as a negative feedback amplifier, having a positive terminal coupled with the first gate signal VGP, such that when the control signal SIC_ON is logically high, the first switch SW1 is operable to connect with the first operational amplifier OPA1. As a result, the first operational amplifier OPA1 is able to perform as a buffer providing the first gate signal VGP to drive and bias the first output stage circuit 60A.

Figure 8:
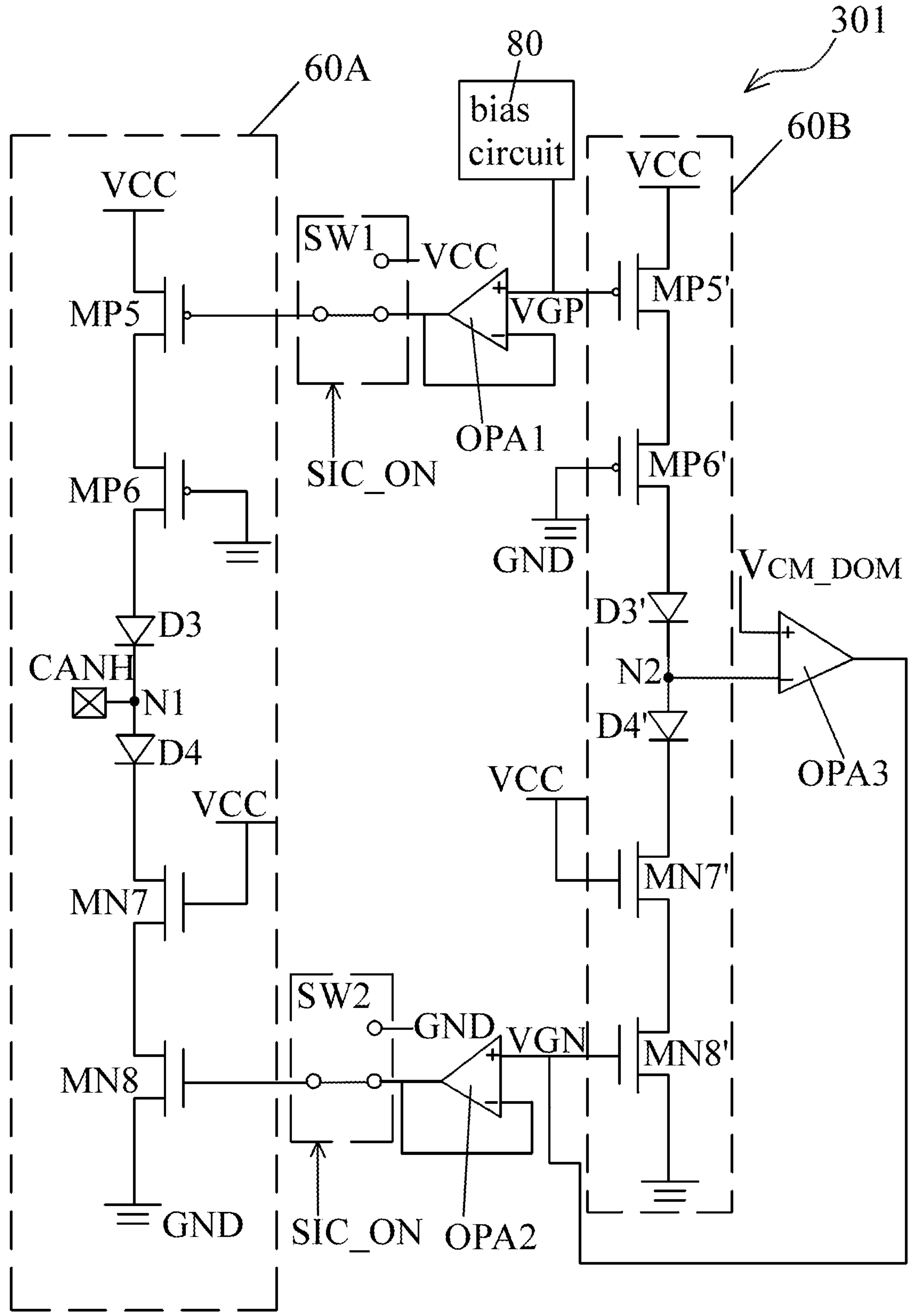
FIG. 8 schematically shows a layout structural diagram of the first operational transconductance amplifier (OTA1) of the disclosed transmitter circuit with ringing suppression in accordance with one embodiment of the present invention, when the first switch is electrically coupled to the first operational amplifier, and the second switch is electrically coupled to the second operational amplifier, and the first gate signal VGP is an output signal generated by a bias circuit while the second gate signal VGN is an output signal of the third operational amplifier.

According to one feasible embodiment of the present invention, the first gate signal VGP can be alternatively an output signal of the third operational amplifier OPA3, as indicated in FIG. 7. However, the present invention is not limited thereto. According to one another feasible embodiment of the present invention, the first gate signal VGP can be alternatively made and provided as an output signal generated by a bias circuit 80 as indicated in FIG. 8. FIG. 8 shows another practicable embodiment of the present invention.

In view of the same design manners, it is evident that according to the technical contents of the present invention, the second operational amplifier OPA2 may also be a negative feedback amplifier, having a positive terminal coupled with a second gate signal VGN. By employing such configurations, when the control signal SIC_ON turns logically high in the active recessive state $T_{actrec}$, then in such an operating condition, the second switch SW2 is operable to connect with the second operational amplifier OPA2, such that the second operational amplifier OPA2 is also a buffer providing the second gate signal VGN to drive and bias the first output stage circuit 60A.

As can be seen, it is believed that the second gate signal VGN can be optionally made as an output signal of the third operational amplifier OPA3, as illustrated in the embodiment of FIG. 8. Alternatively, the second gate signal VGN may also be an output signal generated by a bias circuit 70 as illustrated in the embodiment of FIG. 7. The present invention is not limited by the generation sources of the first gate signal VGP and/or the second gate signal VGN. To sum above, for people who are skilled in the art and having ordinary understandings and technical backgrounds to the present invention, it would be allowed for people skilled in the technical backgrounds, to make various modifications or changes depending on different circuit regulations /d/ or specifications without departing from the scope of the invention. That is to say, the present invention is certainly not limited thereto. And the variant embodiments and/or circuit implementations should still fall into the claim scope of the present invention.

And furthermore, regarding the circuit configuration of the first output stage circuit 60A and the second output stage circuit 60B, it can be seen that the second output stage circuit 60B is a replica circuit of the first output stage circuit 60A.

As can be seen, the first output stage circuit 60A comprises at least one fifth transistor MP5, a sixth transistor MP6, a third diode D3, a fourth diode D4, a seventh transistor MN7 and at least one eighth transistor MN8 which are electrically connected in series. And a first node N1 is configured between the third diode D3 and the fourth diode D4 and coupled with the CAN high voltage signal CANH. The at least one fifth transistor MP5 is electrically connected between a power supply terminal VCC, the first switch SW1 and the sixth transistor MP6. The sixth transistor MP6 is electrically connected between the at least one fifth transistor MP5, a ground terminal GND and the third diode D3. In addition, the seventh transistor MN7 is electrically connected between the fourth diode D4, the power supply terminal VCC and the at least one eighth transistor MN8, and the at least one eighth transistor MN8 is electrically connected between the seventh transistor MN7, the second switch SW2 and the ground terminal GND.

According to the embodiment of the present invention, the at least one fifth transistor MP5 is a P-type low-voltage (LV) Metal-oxide-semiconductor Field effect transistor (MOSFET), having a gate terminal connected with the first switch SW1, a source terminal connected with the power supply terminal VCC and a drain terminal connected with the sixth transistor MP6.

The sixth transistor MP6 is a P-type high-voltage (HV) Metal-oxide-semiconductor Field effect transistor (MOSFET), having a gate terminal connected with the ground terminal GND, a source terminal connected with the at least one fifth transistor MP5 and a drain terminal connected with the third diode D3.

In addition, the third diode D3 is a high-voltage (HV) diode, having an anode connected with the sixth transistor MP6 and a cathode connected with the first node N1 and the CAN high voltage signal CANH.

As a result, when the control signal SIC_ON is logically high, the first switch SW1 is operable to connect with the first operational amplifier OPA1, and the first gate signal VGP either provided by the third operational amplifier OPA3 as well as the second output stage circuit 60B (as in the embodiment of FIG. 7), or provided by a bias circuit 80 (as in the embodiment of FIG. 8) can be used through the first operational amplifier OPA1 as a buffer, driving the gate terminal of the fifth transistor MP5 when in the active recessive state $T_{actrec}$.

In another aspect, the fourth diode D4 is a high-voltage (HV) diode, having a cathode connected with the seventh transistor MN7 and an anode connected with the first node N1 and the CAN high voltage signal CANH.

The seventh transistor MN7 is an N-type high-voltage (HV) Metal-oxide-semiconductor Field effect transistor (MOSFET), having a gate terminal connected with the power supply terminal VCC, a source terminal connected with the at least one eighth transistor MN8 and a drain terminal connected with the fourth diode D4. And the at least one eighth transistor MN8 is an N-type low-voltage (LV) Metal-oxide-semiconductor Field effect transistor (MOSFET), having a gate terminal connected with the second switch SW2, a source terminal connected with the ground terminal GND and a drain terminal connected with the seventh transistor MN7.

As a result, when the control signal SIC_ON is logically high, the second switch SW2 is operable to connect with the second operational amplifier OPA2, and the second gate signal VGN either provided by the third operational amplifier OPA3 as well as the second output stage circuit 60B (as in the embodiment of FIG. 8), or provided by a bias circuit 70 (as in the embodiment of FIG. 7) can be used through the second operational amplifier OPA2 as a buffer, driving the gate terminal of the eighth transistor MN8 when in the active recessive state $T_{actrec}$.

As can be seen, since the second output stage circuit 60B is a replica circuit of the first output stage circuit 60A, the second output stage circuit 60B is similarly composed of at least one fifth transistor MP5', a sixth transistor MP6', a third diode D3', a fourth diode D4', a seventh transistor MN7' and at least one eighth transistor MN8' which are electrically connected in series. The descriptions and electrical connections therein the replica circuit are thus similar to those in the first output stage circuit 60A.

For instance, the at least one fifth transistor MP5' is electrically connected between a power supply terminal VCC, the first operational amplifier OPA1 and the sixth transistor MP6'. And the first gate signal VGP is a gate driving signal of the fifth transistor MP5' of the replica circuit. The sixth transistor MP6' is electrically connected between the at least one fifth transistor MP5', a ground terminal GND and the third diode D3'. In addition, the seventh transistor MN7' is electrically connected between the fourth diode D4', the power supply terminal VCC and the at least one eighth transistor MN8', and the at least one eighth transistor MN8' is electrically connected between the seventh transistor MN7', the second operational amplifier OPA2 and the ground terminal GND.

According to the embodiment of the present invention, the at least one fifth transistor MP5' is a P-type low-voltage (LV) Metal-oxide-semiconductor Field effect transistor (MOSFET), having a gate terminal connected with the positive terminal of the first operational amplifier OPA1, a source terminal connected with the power supply terminal VCC and a drain terminal connected with the sixth transistor MP6'.

The sixth transistor MP6' is a P-type high-voltage (HV) Metal-oxide-semiconductor Field effect transistor (MOSFET), having a gate terminal connected with the ground terminal GND, a source terminal connected with the at least one fifth transistor MP5' and a drain terminal connected with the third diode D3'.

In addition, the third diode D3' is a high-voltage (HV) diode, having an anode connected with the sixth transistor MP6' and a cathode connected with the second node N2, which is the negative terminal of the third operational amplifier OPA3 and the fourth diode D4'.

Moreover, the fourth diode D4' is a high-voltage (HV) diode, having a cathode connected with the seventh transistor MN7' and an anode connected with the second node N2, which is the negative terminal of the third operational amplifier OPA3 and the third diode D3'.

The seventh transistor MN7' is an N-type high-voltage (HV) Metal-oxide-semiconductor Field effect transistor (MOSFET), having a gate terminal connected with the power supply terminal VCC, a source terminal connected with the at least one eighth transistor MN8' and a drain terminal connected with the fourth diode D4'. And the at least one eighth transistor MN8' is an N-type low-voltage (LV) Metal-oxide-semiconductor Field effect transistor (MOSFET), having a gate terminal connected with the positive terminal of the second operational amplifier OPA2, a source terminal connected with the ground terminal GND and a drain terminal connected with the seventh transistor MN7'. And the second gate signal VGN is a gate driving signal of the eighth transistor MN8' of the replica circuit.

As a result, when the control signal SIC_ON is logically high, the first switch SW1 is operable to connect with the first operational amplifier OPA1, and the second switch SW2 is operable to connect with the second operational amplifier OPA2. And according to such electrical connections, the first gate signal VGP and the second gate signal VGN either provided by the third operational amplifier OPA3 as well as the second output stage circuit 60B or provided by a bias circuit can be thus adopted through the first operational amplifier OPA1 and the second operational amplifier OPA2 as a buffer, to drive the gate terminal of the fifth transistor MP5 and of the eighth transistor MN8 in the first output stage circuit 60A when in the active recessive state $T_{actrec}$.

It is evident that the first gate signal VGP is also a gate driving voltage to bias a gate terminal of the fifth transistor MP5' of the second output stage circuit 60B. And the second gate signal VGN is also a gate driving voltage to bias a gate terminal of the eighth transistor MN8' of the second output stage circuit 60B.

Figure 9:
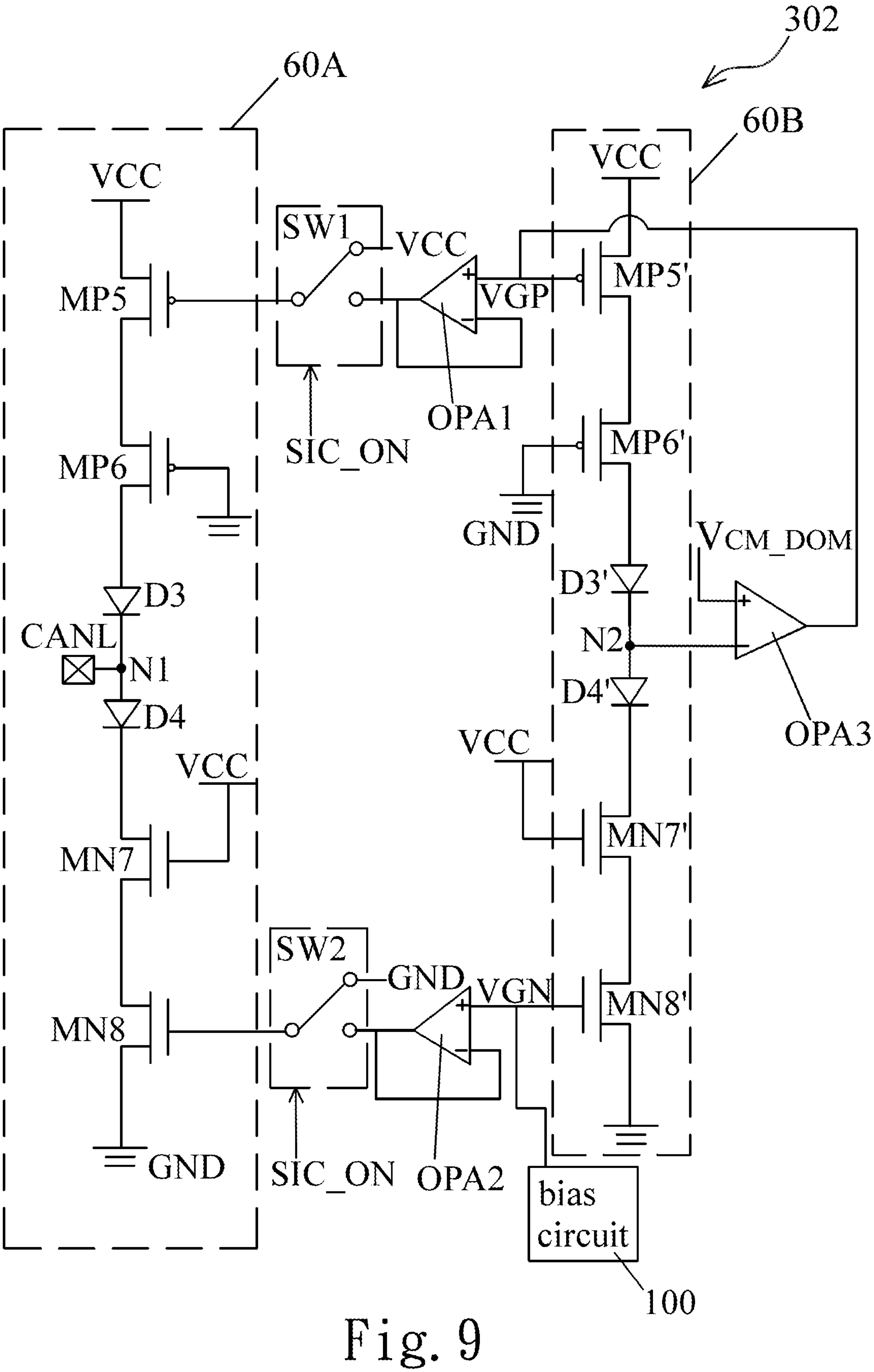
FIG. 9 schematically shows a layout structural diagram of the second operational transconductance amplifier (OTA2) of the disclosed transmitter circuit with ringing suppression in accordance with one embodiment of the present invention, when the first switch is electrically coupled to the power supply terminal VCC, and the second switch is electrically coupled to the ground terminal GND, and the first gate signal VGP is an output signal of the third operational amplifier while the second gate signal VGN is an output signal generated by a bias circuit.

And moreover, please refer to FIG. 9, in which FIG. 9 shows a layout structural diagram of the second operational transconductance amplifier (OTA2) 302 of the disclosed transmitter circuit with ringing suppression in accordance with one embodiment of the present invention. As can be seen in FIG. 9, the circuit configurations of the second operational transconductance amplifier (OTA2) 302 is mostly the same as the circuit configurations of the first operational transconductance amplifier (OTA1) 301 in FIG. 6, which comprises the first output stage circuit 60A, a first switch SW1, a second switch SW2, a replica circuit of the first output stage circuit 60A (which is the second output stage circuit 60B), a first operational amplifier OPA1, a second operational amplifier OPA2 and a third operational amplifier OPA3. The difference between the first operational transconductance amplifier (OTA1) 301 and the second operational transconductance amplifier (OTA2) 302 is that, an input signal of the second operational transconductance amplifier (OTA2) 302 is the CAN low voltage signal CANL. In this case, the first node N1 where the third diode D3 and the fourth diode D4 of the first output stage circuit 60A are connected, is coupled with the CAN low voltage signal CANL. FIG. 9 shows an illustration of the disclosed second operational transconductance amplifier (OTA2) 302 when the control signal SIC_ON is logically low, so the first switch SW1 is coupled with the power supply terminal VCC, the second switch SW2 is coupled with the ground terminal GND, and the first operational amplifier OPA1, the second operational amplifier OPA2, the third operational amplifier OPA3, and the second output stage circuit 60B forms an open circuit.

Figure 10:
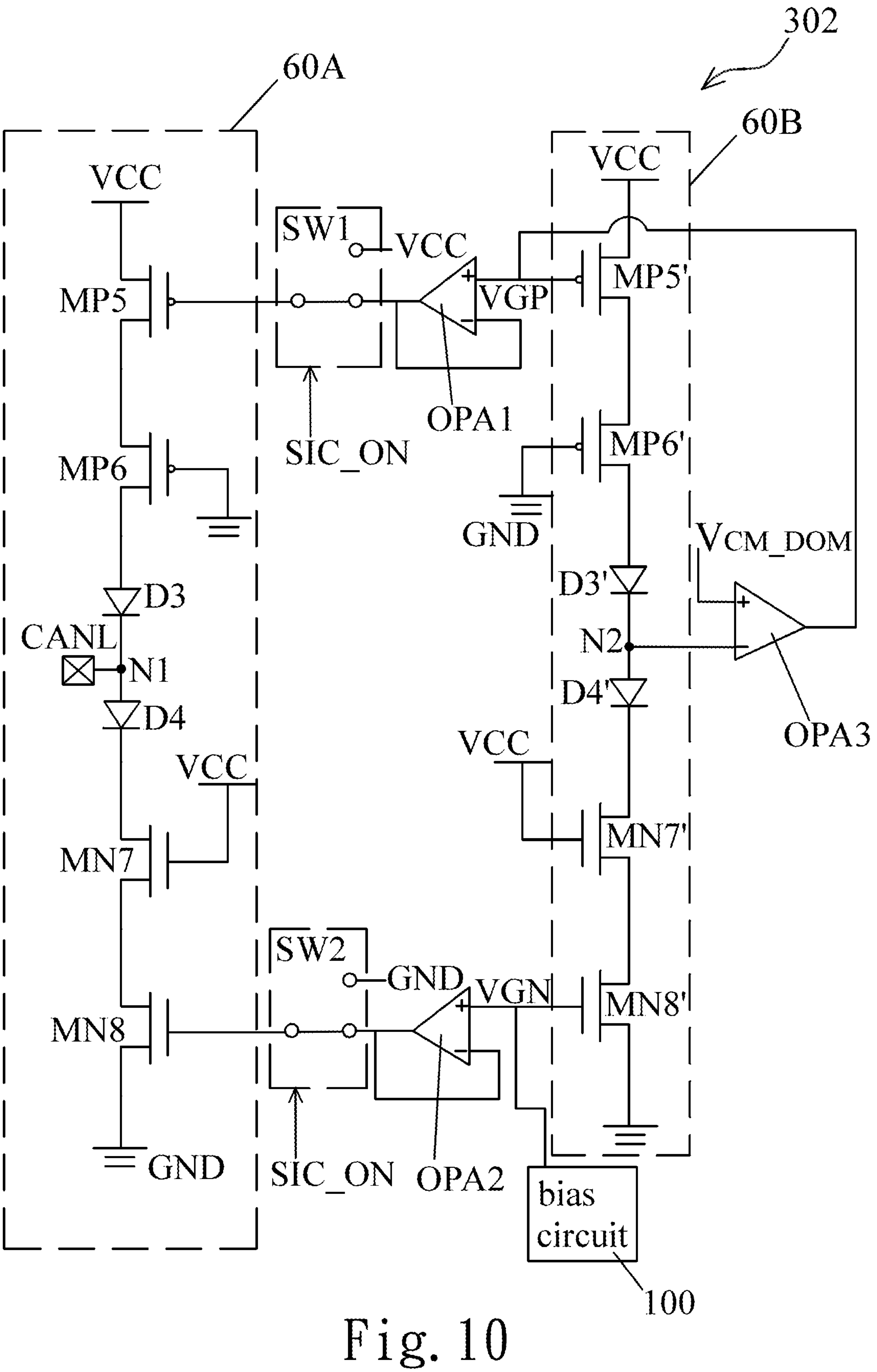
FIG. 10 schematically shows a layout structural diagram of the second operational transconductance amplifier (OTA2) of the disclosed transmitter circuit with ringing suppression in accordance with one embodiment of the present invention, when the first switch is electrically coupled to the first operational amplifier, and the second switch is electrically coupled to the second operational amplifier, and the first gate signal VGP is an output signal of the third operational amplifier while the second gate signal VGN is an output signal generated by a bias circuit.

FIG. 10, on the contrary, shows an illustration of the disclosed second operational transconductance amplifier (OTA2) 302 when it comes to the transmit data signal TXD transition from the dominant state to the recessive state, as in the active recessive state $T_{actrec}$, and the control signal SIC_ON turns logically high, it can be expected that the first switch SW1 will be coupled with the first operational amplifier OPA1, the second switch SW2 will be coupled with the second operational amplifier OPA2, and the first operational amplifier OPA1, the second operational amplifier OPA2, the third operational amplifier OPA3, and the second output stage circuit 60B forms a closed loop. Under such an operating circumstance, the first gate signal VGP can be employed to drive and bias the fifth transistor MP5 in the first output stage circuit 60A. And the second gate signal VGN can be employed to drive and bias the eighth transistor MN8 in the first output stage circuit 60A.

Figure 11:
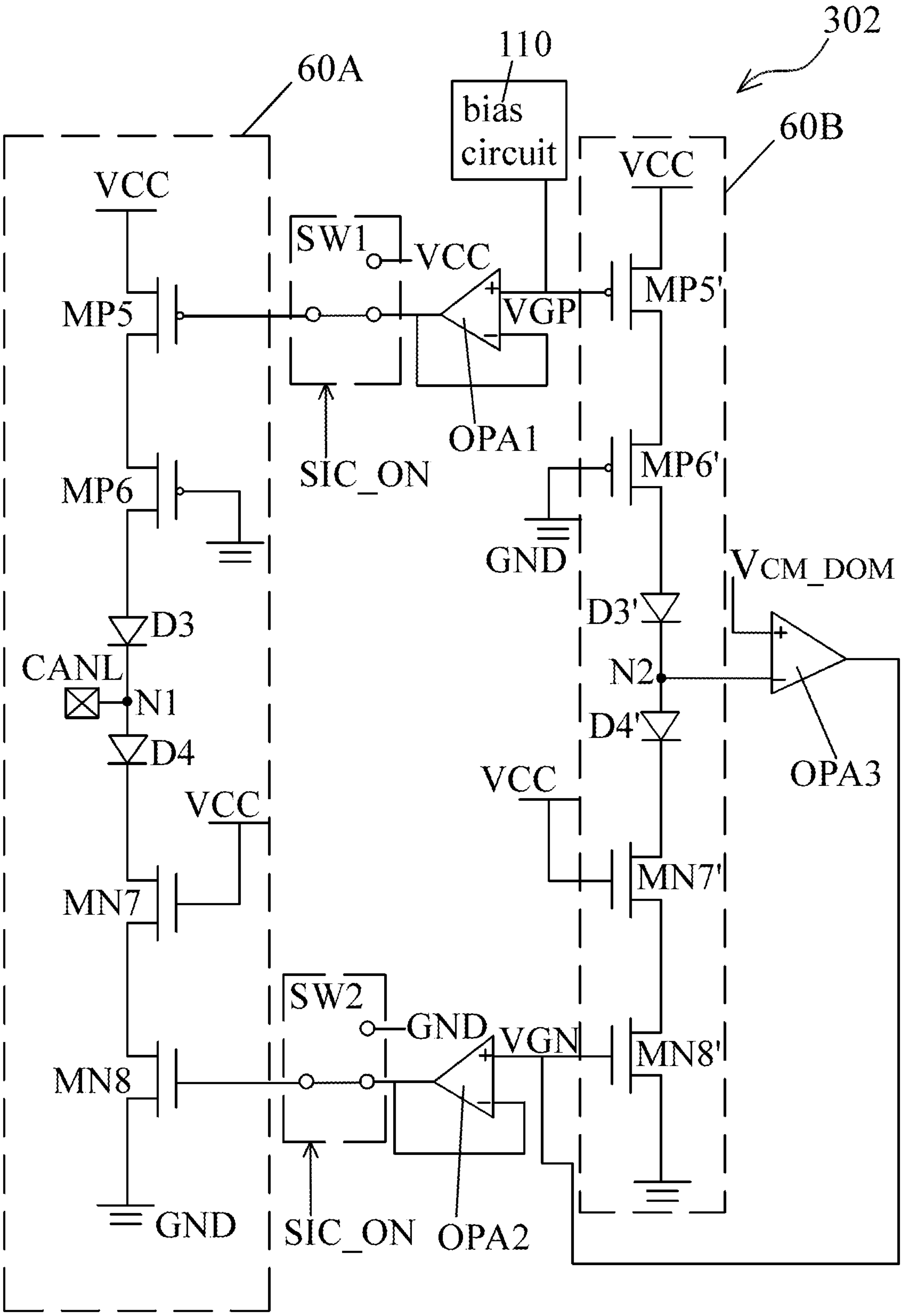
FIG. 11 schematically shows a layout structural diagram of the second operational transconductance amplifier (OTA2) of the disclosed transmitter circuit with ringing suppression in accordance with one embodiment of the present invention, when the first switch is electrically coupled to the first operational amplifier, and the second switch is electrically coupled to the second operational amplifier, and the first gate signal VGP is an output signal generated by a bias circuit while the second gate signal VGN is an output signal of the third operational amplifier.

As discussed earlier, either the first gate signal VGP or the second gate signal VGN can be optionally provided by an output signal of the third operational amplifier OPA3, or an output signal generated by a bias circuit. FIG. 10 shows an exemplary embodiment wherein the first gate signal VGP is an output signal of the third operational amplifier OPA3 and the second gate signal VGN is generated by a bias circuit 100. FIG. 11 shows another exemplarily applicable embodiment wherein the first gate signal VGP is generated by a bias circuit 110, while the second gate signal VGN is an output signal of the third operational amplifier OPA3. It should be noted and understood that both configurations are feasible for implementing the circuit layouts of the transmitter circuit with ringing suppression according to the present invention.

As a result, based on the above-disclosed technical contents of the present invention, it is believed that when it comes to the transmit data signal TXD transition from the dominant state to the recessive state, as for the active recessive state $T_{actrec}$, then the control signal SIC_ON will be transiting from a low voltage level to a high voltage level (turning logically high), obtaining the second node N2 of the second output stage circuit 60B, which is coupled with a negative terminal of the third operational amplifier OPA3, being equal to the common mode voltage of the dominant state $V_{CM\_DOM}$. As a result, it can be controlled and obtained that a voltage level of the first node N1 in the first output stage circuit 60A is equal to a voltage level of the second node N2 in the replica circuit (the second output stage circuit 60B), such that the CAN high voltage signal CANH, the CAN low voltage signal CANL and the common mode voltage of the dominant state $V_{CM\_DOM}$ are equal. By employing the technical solution, the present invention effectively achieves in the inventive efficiencies of extraordinary ringing suppression behaviors.

Figure 12:
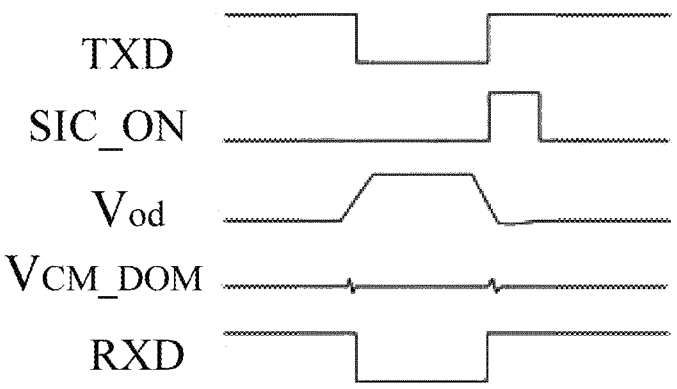
FIG. 12 schematically shows a plurality of signal waveforms, including the transmit data (TXD) signal in the CAN bus, the control signal SIC_ON, the CAN bus differential voltage signal Vod, the common mode voltage of the dominant state $V_{CM\_DOM}$, and the receive data (RXD) signal in the CAN bus, after employing the technical solution of the present invention.

And furthermore, please refer to FIG. 12, which schematically shows the plurality of signal waveforms, including the transmit data (TXD) signal in the CAN bus, the control signal SIC_ON, the CAN bus differential voltage signal Vod, wherein Vod=(VCANH−VCANL), in which VCANH is a voltage level of the CAN high voltage signal CANH while VCANL is a voltage level of the CAN low voltage signal CANL, the common mode voltage of the dominant state $V_{CM\_DOM}$, and the receive data (RXD) signal in the CAN bus, after employing the technical solution of the present invention. As can be seen in view of these signal waveforms, it has been well verified that, the RXD signal can be generated and transmitted precisely without ringing interferences and thus no transmission and/or data errors are generated. The present invention is applied effectively.

In addition, it should be noted that the size of each and every composing element in the replica circuit (the second output stage circuit) should be determined as in proportional to the corresponding element in the first output stage circuit for the purpose of precisely controlling the voltage level of the first node N1 in the first output stage circuit 60A as well as the voltage level of the second node N2 in the second output stage circuit 60B as equal to the common mode voltage of the dominant state $V_{CM\_DOM}$. As a result, while the first operational transconductance amplifier (OTA1) and the second operational transconductance amplifier (OTA2) are operating, the voltage level of the CAN high voltage signal CANH and the voltage level of the CAN low voltage signal CANL can be biased by the first operational transconductance amplifier (OTA1) and the second operational transconductance amplifier (OTA2) so as to reach the value of the common mode voltage of the dominant state $V_{CM\_DOM}$ in order to suppress the ringing phenomenon occurring on the CAN bus.

Furthermore, according to the present invention, the fifth transistor MP5 and the eighth transistor MN8 disposed in the first output stage circuit 60A of either of the operational transconductance amplifier (OTA1 or OTA2) could be made of one or more transistors respectively. In this case, each of these transistors will be turned on sequentially by one corresponding first switch SW1 and second switch SW2 in order to reduce the glitch of (CANH+CANL) that effects electromagnetic emission directly.

In other words, regarding the detailed circuit configuration of the first operational transconductance amplifier (OTA1) 301, it is applicable that the first operational transconductance amplifier 301 may further comprise a plurality of the fifth transistors MP5 and a plurality of the first switches SW1. According to such a variant embodiment, then each of the fifth transistors MP5 is disposed and connected corresponding to each of the first switches SW1, so that the plurality of the fifth transistors MP5 can be turned on sequentially according to the plurality of the first switches SW1 so as to reduce a glitch of the CAN high voltage signal CANH and the CAN low voltage signal CANL.

By employing the same design manners, then the second operational transconductance amplifier 302 may also further comprise a plurality of the fifth transistors MP5 and a plurality of the first switches SW1. And each of the fifth transistors MP5 is disposed and connected corresponding to each of the first switches SW1, so that the plurality of the fifth transistors MP5 can be turned on sequentially according to the plurality of the first switches SW1 so as to reduce a glitch of the CAN high voltage signal CANH and the CAN low voltage signal CANL.

On the other hand, then the eighth transistor MN8 and its corresponding second switch SW2 may also be made multiple numbers. According to the alternative embodiment, then the first operational transconductance amplifier 301 may further comprise a plurality of the eighth transistors MN8 and a plurality of the second switches SW2, such that each of the eighth transistors MN8 is disposed and connected corresponding to each of the second switches SW2. As a result, it is believed that the plurality of the eighth transistors MN8 can be turned on sequentially according to the plurality of the second switches SW2 so as to reduce a glitch of the CAN high voltage signal CANH and the CAN low voltage signal CANL. Similarly, within the second operational transconductance amplifier 302, it is also applicable to dispose a plurality of the eighth transistors MN8 and a plurality of the second switches SW2, such that each of the eighth transistors MN8 is disposed and connected corresponding to each of the second switches SW2. As such, it can be obtained that the plurality of the eighth transistors MN8 can be turned on sequentially according to the plurality of the second switches SW2 in order to reduce a glitch of the CAN high voltage signal CANH and the CAN low voltage signal CANL that effects electromagnetic emission directly. The Applicants of the present invention herein are providing a multiple of practical circuit layout options for further expanding the claim scope of the present invention.

Figure 13:
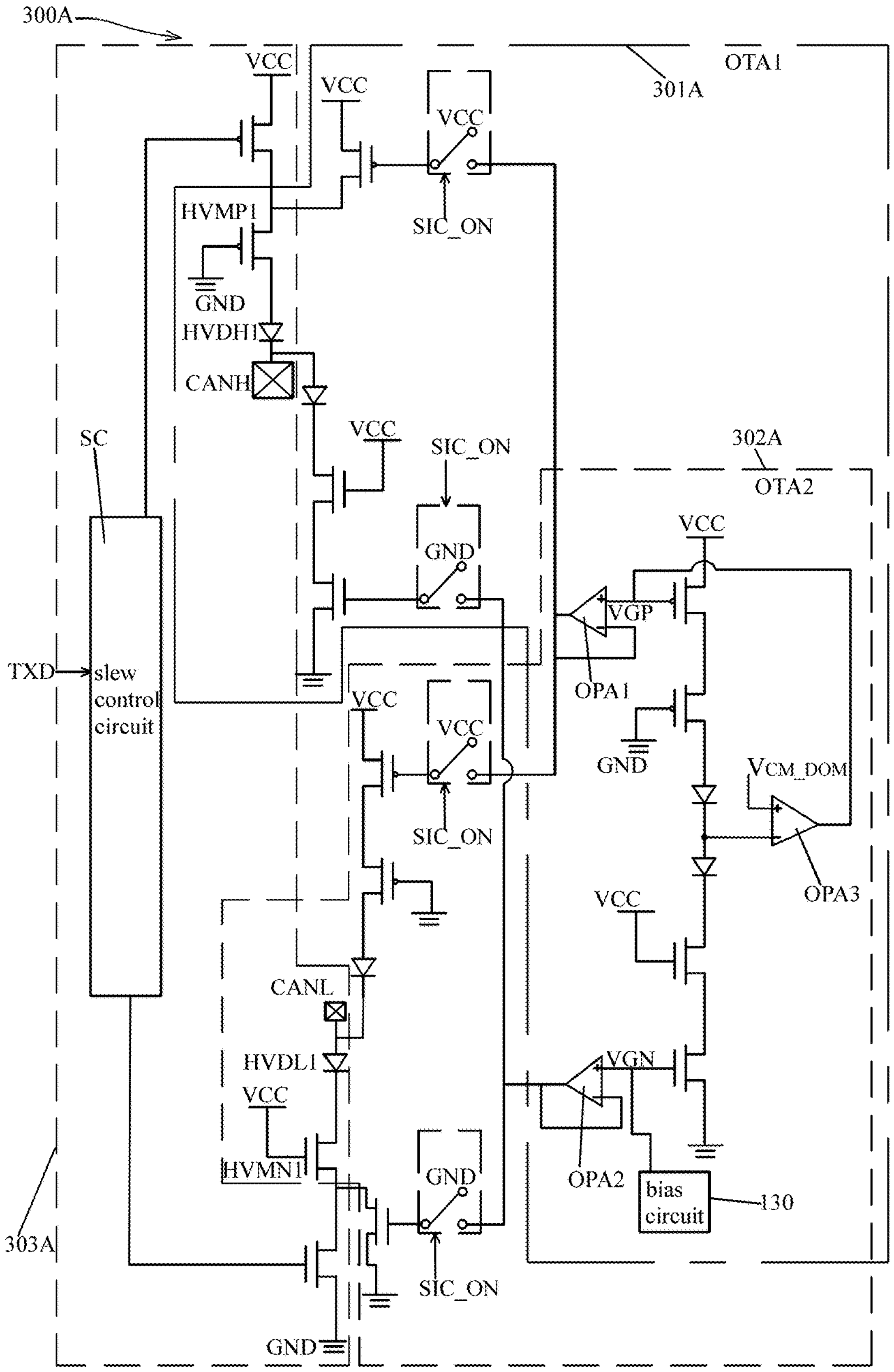
FIG. 13 schematically shows another feasible layout structural diagram of a proposed transmitter circuit with ringing suppression in accordance with an alternative embodiment of the present invention, wherein the first operational transconductance amplifier (OTA1) is able to share the transistor HVMP1 and the diode HVDH1 with the CAN bus driver stage, the second operational transconductance amplifier (OTA2) 302A is able to share the transistor HVMN1 and the diode HVDL1 with the CAN bus driver stage, and the first operational transconductance amplifier (OTA1) and the second operational transconductance amplifier (OTA2) additionally share the replica circuit of output stage and the third operational amplifier OPA3 in order to achieve the objectives of saving more circuit layout area and reducing area consumption, and wherein the second gate signal VGN is an output signal generated by a bias circuit.

And furthermore, please refer to FIG. 13, which schematically shows another feasible layout structural diagram of a proposed transmitter circuit with ringing suppression in accordance with an alternative embodiment of the present invention. As can be seen in FIG. 13, the proposed transmitter circuit 300A comprises the first operational transconductance amplifier (OTA1) 301A, the second operational transconductance amplifier (OTA2) 302A and the CAN bus driver stage 303A. The modified transmitter circuit 300A according to the FIG. 13 embodiment is disclosed in order to be more economical. For achieving the objectives of saving more circuit layout area and reducing area consumption, the first operational transconductance amplifier (OTA1) 301A is able to share the transistor HVMP1 and the diode HVDH1 with the CAN bus driver stage 303A. In addition, the second operational transconductance amplifier (OTA2) 302A is able to share the transistor HVMN1 and the diode HVDL1 with the CAN bus driver stage 303A. Furthermore, the first operational transconductance amplifier (OTA1) 301A and the second operational transconductance amplifier (OTA2) 302A may additionally share the replica circuit of output stage and the third operational amplifier OPA3.

Figure 14:
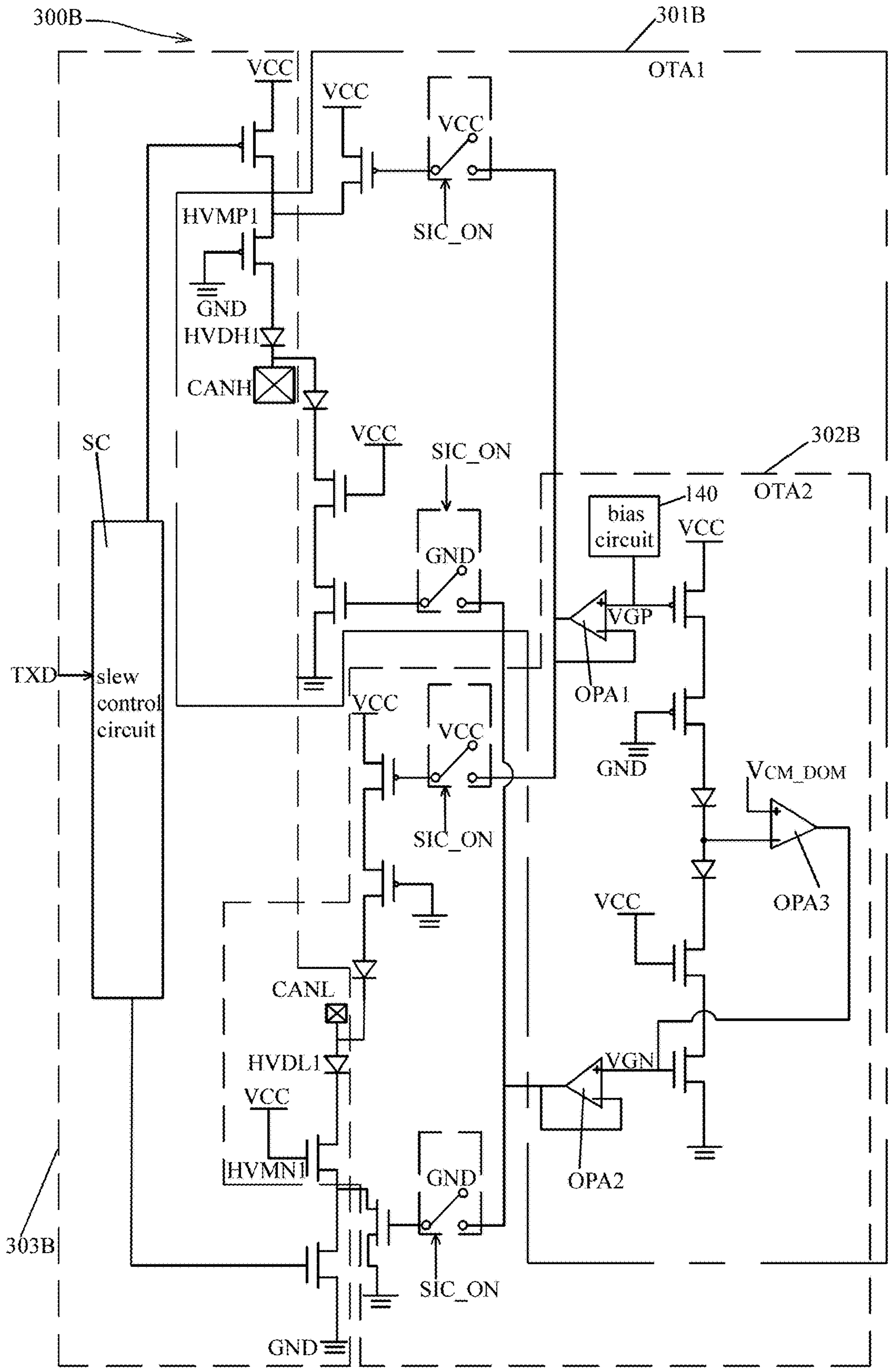
FIG. 14 schematically shows one another feasible layout structural diagram of a proposed transmitter circuit with ringing suppression in accordance with one another alternative embodiment of the present invention, wherein the first operational transconductance amplifier (OTA1) is able to share the transistor HVMP1 and the diode HVDH1 with the CAN bus driver stage, the second operational transconductance amplifier (OTA2) 302A is able to share the transistor HVMN1 and the diode HVDL1 with the CAN bus driver stage, and the first operational transconductance amplifier (OTA1) and the second operational transconductance amplifier (OTA2) additionally share the replica circuit of output stage and the third operational amplifier OPA3 in order to achieve the objectives of saving more circuit layout area and reducing area consumption, and wherein the first gate signal VGP is an output signal generated by a bias circuit.

And in addition, please refer to FIG. 14, which schematically shows one another feasible layout structural diagram of a proposed transmitter circuit with ringing suppression in accordance with another alternative embodiment of the present invention. As can be seen in the FIG. 14 embodiment, the another proposed transmitter circuit 300B includes the first operational transconductance amplifier (OTA1) 301B, the second operational transconductance amplifier (OTA2) 302B and the CAN bus driver stage 303B. According to the circuit layout configuration, it can be seen that the first operational transconductance amplifier (OTA1) 301B is able to share the transistor HVMP1 and the diode HVDH1 with the CAN bus driver stage 303B. And the second operational transconductance amplifier (OTA2) 302B is able to share the transistor HVMN1 and the diode HVDL1 with the CAN bus driver stage 303B. And the first operational transconductance amplifier (OTA1) 301B and the second operational transconductance amplifier (OTA2) 302B additionally share the replica circuit of output stage and the third operational amplifier OPA3 for less circuit layout consumption. What differs from the previously disclosed embodiment in FIG. 13 is that, the bias circuit 130 in FIG. 13 is used to generate the second gate signal VGN. On the contrary, the bias circuit 140 in FIG. 14 is used to generate the first gate signal VGP instead of generating the second gate signal VGN. According to the embodiment in FIG. 14, the second gate signal VGN is generated by the replica circuit of output stage and the third operational amplifier OPA3. Both embodiments in FIG. 13 and in FIG. 14 are applicable for implementing the present invention, and the present invention covers these embodiments with equality based on the disclosed technical spirits for sure.

And yet furthermore, the Applicants of the invention in another aspect disclose another practical embodiment for providing the common mode voltage of the dominant state $V_{CM\_DOM}$. In one embodiment, the reference voltage (which is the common mode voltage of the dominant state $V_{CM\_DOM}$) provided to the positive terminal of the third operational amplifier OPA3 can be alternatively connected to a reference voltage generator. And this reference voltage generator circuit may also be a replica circuits of the CAN bus driver stage which generates the common mode voltage of the dominant state $V_{CM\_DOM}$ such that the common mode voltage of the dominant state $V_{CM\_DOM}$ will be equal to the bus common mode voltage of dominant state.

To sum above, as the CAN bus speeds have greatly increased in the recent years, the conventional ringing issue has also increased. As a CAN bus transceiver transitions from a "dominant state" to a "recessive state", reflections from improperly terminated stubs may cause ringing on the transceiver. And when the magnitude of the ringing is high enough, a transceiver will misinterpret the ringing as a dominant bit. As such, the unwanted ringing phenomenon has been known to cause bit errors. In order to solve the foregoing deficiency, the present invention is thus provided, and in view of the above-mentioned technical contents disclosed in the present invention, it is believed that ringing on the controller area network bus due to improper electrical termination can be successfully eliminated and suppressed by using the disclosed ringing suppression circuit of the present invention.

As a result, to sum above, on account of the design manners and circuit layout configuration of the present invention, it is obvious that when the CAN bus transits from a dominant state to a recessive state and in particular, as in the active recessive state, the disclosed circuit diagram proposed by the present invention can be applied effectively and significantly achieves in suppressing the conventional ringing phenomenon. And what is worthy emphasizing is that, the present invention is certainly not limited thereto by the foregoing schematic diagram, and yet some plurality of alternative variations and embodiments which have been provided and discussed by the applicants of the present invention earlier in the previous paragraphs of the invention application are to be applicable and fall into the claim scope of the present invention.

As a result, it is believed that for people who are skilled in the art and having ordinary understandings and technical backgrounds to the present invention, various modifications and/or variation embodiments depending on different circuit regulations and/or specifications without departing from the scope of the invention are practicable and to be expected. That is to say, the present invention is certainly not limited thereto. And the variant embodiments and/or circuit implementations should still fall into the claim scope of the present invention.

And furthermore, since a glitch of the CAN high voltage signal CANH and the CAN low voltage signal CANL may affect electromagnetic emission directly, in order to reduce the glitch of (CANH+CANL), it is believed that the present invention is able to further achieve in reducing the glitch of (CANH+CANL) by cascading a plurality of transistors in the CAN bus driver stage. And as a result, it is believed that a superior electromagnetic emission (EME) performance can thus be maintained significantly as well by employing the present invention.

Hereinafter, according to the technical contents of the present invention which have been provided by the Applicants as illustrated in the previous paragraphs, it is obvious that the ringing suppression circuit is effective. Meanwhile, a maximum data rate of the controller area network bus is accomplished by adopting the present invention. Therefore, in view of all, it is obvious that the present invention is not only novel and inventive but also believed to be advantageous of solving and avoiding the conventional ringing phenomenon.

As a result, when compared to the prior arts, it is ensured that the present invention apparently shows much more effective performances than before. In addition, it is believed that the present invention is instinct, effective and highly competitive for IC technology and industries in the market nowadays, whereby having extraordinary availability and competitiveness for future industrial developments and being in condition for early allowance.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A transmitter circuit with ringing suppression, applicable to a controller area network (CAN) bus, comprising:

a CAN bus driver stage, receiving a transmit data (TXD) signal in the CAN bus, and generating a pair of differential signals, including a CAN high voltage signal and a CAN low voltage signal;

a first operational transconductance amplifier, being electrically connected with the CAN bus driver stage and receiving the CAN high voltage signal; and a second operational transconductance amplifier, being electrically connected with the CAN bus driver stage and receiving the CAN low voltage signal;

wherein a common mode voltage is provided to the first operational transconductance amplifier and the second operational transconductance amplifier, and a control signal (SIC_ON) is applied to the first operational transconductance amplifier and the second operational transconductance amplifier, such that when the control signal (SIC_ON) is logically high, the first operational transconductance amplifier and the second operational transconductance amplifier actively pulls the CAN high voltage signal and the CAN low voltage signal to be equal to the common mode voltage so as to suppress a ringing phenomenon occurring in the CAN bus.

2. The transmitter circuit with ringing suppression according to claim 1, wherein the common mode voltage is a common mode voltage of a first operating state, and the control signal (SIC_ON) is logically high when the transmit data (TXD) signal in the CAN bus transits from the first operating state to a second operating state.

3. The transmitter circuit with ringing suppression according to claim 2, wherein the first operating state is a dominant state and the second operating state is a recessive state.

4. The transmitter circuit with ringing suppression according to claim 3, wherein the common mode voltage of the first operating state is a common mode voltage of the dominant state ($V_{CM\_DOM}$).

5. The transmitter circuit with ringing suppression according to claim 4, wherein the recessive state further comprises an active recessive state, when the transmit data (TXD) signal in the CAN bus transits from the dominant state to the recessive state, the control signal (SIC_ON) is logically high for a period of time corresponding to the active recessive state shortly after the dominant state.

6. The transmitter circuit with ringing suppression according to claim 5, wherein when the transmit data (TXD) signal in the CAN bus is in the active recessive state, the first operational transconductance amplifier and the second operational transconductance amplifier are turned on so as to pull the CAN high voltage signal and the CAN low voltage signal to the common mode voltage of the dominant state ($V_{CM\_DOM}$) and suppress the ringing phenomenon occurring in the CAN bus.

7. The transmitter circuit with ringing suppression according to claim 6, wherein a positive terminal of the first operational transconductance amplifier is coupled with the common mode voltage of the dominant state ($V_{CM\_DOM}$), a negative terminal and an output terminal of the first operational transconductance amplifier are commonly coupled with the CAN high voltage signal, and wherein the control signal (SIC_ON) transits from a low voltage level to a high voltage level as the transmit data (TXD) signal transits from the dominant state to the active recessive state.

8. The transmitter circuit with ringing suppression according to claim 6, wherein a positive terminal of the second operational transconductance amplifier is coupled with the common mode voltage of the dominant state ($V_{CM\_DOM}$), a negative terminal and an output terminal of the second operational transconductance amplifier are commonly coupled with the CAN low voltage signal, and wherein the control signal (SIC_ON) transits from a low voltage level to a high voltage level as the transmit data (TXD) signal transits from the dominant state to the active recessive state.

9. The transmitter circuit with ringing suppression according to claim 1, wherein the CAN bus driver stage comprises a slew control circuit receiving the transmit data (TXD) signal, and at least one first transistor is further connected to the slew control circuit and a power supply terminal, and the at least one first transistor is serially connected with a second transistor and a first diode in cascade, outputting the CAN high voltage signal; and wherein at least one third transistor is further connected to the slew control circuit and a ground terminal, and the at least one third transistor is serially connected with a fourth transistor and a second diode in cascade, outputting the CAN low voltage signal.

10. The transmitter circuit with ringing suppression according to claim 9, wherein the at least one first transistor is a P-type low-voltage (LV) Metal-oxide-semiconductor Field effect transistor (MOSFET), having a gate terminal connected with the slew control circuit, a source terminal connected with the power supply terminal and a drain terminal connected with the second transistor.

11. The transmitter circuit with ringing suppression according to claim 9, wherein the second transistor is a P-type high-voltage (HV) Metal-oxide-semiconductor Field effect transistor (MOSFET), having a gate terminal connected with the ground terminal, a source terminal connected with the at least one first transistor and a drain terminal connected with the first diode.

12. The transmitter circuit with ringing suppression according to claim 9, wherein the first diode is a high-voltage (HV) diode, having an anode connected with the second transistor and a cathode connected with the first operational transconductance amplifier, outputting the CAN high voltage signal.

13. The transmitter circuit with ringing suppression according to claim 9, wherein the at least one third transistor is an N-type low-voltage (LV) Metal-oxide-semiconductor Field effect transistor (MOSFET), having a gate terminal connected with the slew control circuit, a source terminal connected with the ground terminal and a drain terminal connected with the fourth transistor.

14. The transmitter circuit with ringing suppression according to claim 9, wherein the fourth transistor is an N-type high-voltage (HV) Metal-oxide-semiconductor Field effect transistor (MOSFET), having a gate terminal connected with the power supply terminal, a source terminal connected with the at least one third transistor and a drain terminal connected with the second diode.

15. The transmitter circuit with ringing suppression according to claim 9, wherein the second diode is a high-voltage (HV) diode, having a cathode connected with the fourth transistor and an anode connected with the second operational transconductance amplifier, outputting the CAN low voltage signal.

16. The transmitter circuit with ringing suppression according to claim 1, wherein the first operational transconductance amplifier comprises a first output stage circuit receiving the CAN high voltage signal, the first output stage circuit is successively coupled with a first switch and a second switch, and the first switch is determined to connect with a first operational amplifier by the control signal (SIC_ON), and the second switch is determined to connect with a second operational amplifier by the control signal (SIC_ON), and wherein a second output stage circuit is further electrically connected with the first operational amplifier, the second operational amplifier and a third operational amplifier, where the third operational amplifier receives a common mode voltage of a dominant state ($V_{CM\_DOM}$).

17. The transmitter circuit with ringing suppression according to claim 16, wherein the first operational amplifier is a negative feedback amplifier, having a positive terminal coupled with a first gate signal, and wherein when the control signal (SIC_ON) is logically high, the first switch is operable to connect with the first operational amplifier, such that the first operational amplifier is a buffer providing the first gate signal to drive and bias the first output stage circuit.

18. The transmitter circuit with ringing suppression according to claim 17, wherein the first gate signal is alternatively an output signal of the third operational amplifier, or an output signal generated by a bias circuit.

19. The transmitter circuit with ringing suppression according to claim 17, wherein when the control signal (SIC_ON) is logically low, the first switch is coupled to a power supply terminal and the second switch is coupled to a ground terminal such that the first operational amplifier, the second operational amplifier, the third operational amplifier and the second output stage circuit forms an open circuit.

20. The transmitter circuit with ringing suppression according to claim 16, wherein the second operational amplifier is a negative feedback amplifier, having a positive terminal coupled with a second gate signal, and wherein when the control signal (SIC_ON) is logically high, the second switch is operable to connect with the second operational amplifier, such that the second operational amplifier is a buffer providing the second gate signal to drive and bias the first output stage circuit.

21. The transmitter circuit with ringing suppression according to claim 20, wherein the second gate signal is alternatively an output signal of the third operational amplifier, or an output signal generated by a bias circuit.

22. The transmitter circuit with ringing suppression according to claim 16, wherein the second output stage circuit is a replica circuit of the first output stage circuit.

23. The transmitter circuit with ringing suppression according to claim 16, wherein the first output stage circuit comprises at least one fifth transistor, a sixth transistor, a third diode, a fourth diode, a seventh transistor and at least one eighth transistor which are electrically connected in series, a first node is configured between the third diode and the fourth diode and coupled with the CAN high voltage signal, the at least one fifth transistor is electrically connected between a power supply terminal, the first switch and the sixth transistor, the sixth transistor is electrically connected between the at least one fifth transistor, a ground terminal and the third diode; and wherein the seventh transistor is electrically connected between the fourth diode, the power supply terminal and the at least one eighth transistor, and the at least one eighth transistor is electrically connected between the seventh transistor, the second switch and the ground terminal.

24. The transmitter circuit with ringing suppression according to claim 23, wherein the at least one fifth transistor is a P-type low-voltage (LV) Metal-oxide-semiconductor Field effect transistor (MOSFET), having a gate terminal connected with the first switch, a source terminal connected with the power supply terminal and a drain terminal connected with the sixth transistor.

25. The transmitter circuit with ringing suppression according to claim 23, wherein the sixth transistor is a P-type high-voltage (HV) Metal-oxide-semiconductor Field effect transistor (MOSFET), having a gate terminal connected with the ground terminal, a source terminal connected with the at least one fifth transistor and a drain terminal connected with the third diode.

26. The transmitter circuit with ringing suppression according to claim 23, wherein the third diode is a high-voltage (HV) diode, having an anode connected with the sixth transistor and a cathode connected with the first node and the CAN high voltage signal.

27. The transmitter circuit with ringing suppression according to claim 23, wherein the fourth diode is a high-voltage (HV) diode, having a cathode connected with the seventh transistor and an anode connected with the first node and the CAN high voltage signal.

28. The transmitter circuit with ringing suppression according to claim 23, wherein the seventh transistor is an N-type high-voltage (HV) Metal-oxide-semiconductor Field effect transistor (MOSFET), having a gate terminal connected with the power supply terminal, a source terminal connected with the at least one eighth transistor and a drain terminal connected with the fourth diode.

29. The transmitter circuit with ringing suppression according to claim 23, wherein the at least one eighth transistor is an N-type low-voltage (LV) Metal-oxide-semiconductor Field effect transistor (MOSFET), having a gate terminal connected with the second switch, a source terminal connected with the ground terminal and a drain terminal connected with the seventh transistor.

30. The transmitter circuit with ringing suppression according to claim 23, wherein the third operational amplifier has a positive terminal receiving the common mode voltage of the dominant state ($V_{CM\_DOM}$), a negative terminal coupled with a second node of the second output stage circuit, and an output terminal alternatively coupled with a positive terminal of the first operational amplifier or a positive terminal of the second operational amplifier; and wherein when the control signal (SIC_ON) is logically high, a voltage level of the first node in the first output stage circuit is equal to a voltage level of the second node in the second output stage circuit, such that the CAN high voltage signal, the CAN low voltage signal and the common mode voltage of the dominant state ($V_{CM\_DOM}$) are equal.

31. The transmitter circuit with ringing suppression according to claim 1, wherein the second operational transconductance amplifier comprises a first output stage circuit receiving the CAN low voltage signal, the first output stage circuit is successively coupled with a first switch and a second switch, and the first switch is determined to connect with a first operational amplifier by the control signal (SIC_ON), and the second switch is determined to connect with a second operational amplifier by the control signal (SIC_ON), and wherein a second output stage circuit is further electrically connected with the first operational amplifier, the second operational amplifier and a third operational amplifier, where the third operational amplifier receives a common mode voltage of a dominant state ($V_{CM\_DOM}$).

32. The transmitter circuit with ringing suppression according to claim 31, wherein the first operational amplifier is a negative feedback amplifier, having a positive terminal coupled with a first gate signal, and wherein when the control signal (SIC_ON) is logically high, the first switch is operable to connect with the first operational amplifier, such that the first operational amplifier is a buffer providing the first gate signal to drive and bias the first output stage circuit.

33. The transmitter circuit with ringing suppression according to claim 32, wherein the first gate signal is alternatively an output signal of the third operational amplifier, or an output signal generated by a bias circuit.

34. The transmitter circuit with ringing suppression according to claim 32, wherein when the control signal (SIC_ON) is logically low, the first switch is coupled to a power supply terminal and the second switch is coupled to a ground terminal such that the first operational amplifier, the second operational amplifier, the third operational amplifier and the second output stage circuit forms an open circuit.

35. The transmitter circuit with ringing suppression according to claim 31, wherein the second operational amplifier is a negative feedback amplifier, having a positive terminal coupled with a second gate signal, and wherein when the control signal (SIC_ON) is logically high, the second switch is operable to connect with the second operational amplifier, such that the second operational amplifier is a buffer providing the second gate signal to drive and bias the first output stage circuit.

36. The transmitter circuit with ringing suppression according to claim 35, wherein the second gate signal is alternatively an output signal of the third operational amplifier, or an output signal generated by a bias circuit.

37. The transmitter circuit with ringing suppression according to claim 31, wherein the second output stage circuit is a replica circuit of the first output stage circuit.

38. The transmitter circuit with ringing suppression according to claim 31, wherein the first output stage circuit comprises at least one fifth transistor, a sixth transistor, a third diode, a fourth diode, a seventh transistor and at least one eighth transistor which are electrically connected in series, a first node is configured between the third diode and the fourth diode and coupled with the CAN low voltage signal, the at least one fifth transistor is electrically connected between a power supply terminal, the first switch and the sixth transistor, the sixth transistor is electrically connected between the at least one fifth transistor, a ground terminal and the third diode; and wherein the seventh transistor is electrically connected between the fourth diode, the power supply terminal and the at least one eighth transistor, and the at least one eighth transistor is electrically connected between the seventh transistor, the second switch and the ground terminal.

39. The transmitter circuit with ringing suppression according to claim 38, wherein the at least one fifth transistor is a P-type low-voltage (LV) Metal-oxide-semiconductor Field effect transistor (MOSFET), having a gate terminal connected with the first switch, a source terminal connected with the power supply terminal and a drain terminal connected with the sixth transistor.

40. The transmitter circuit with ringing suppression according to claim 38, wherein the sixth transistor is a P-type high-voltage (HV) Metal-oxide-semiconductor Field effect transistor (MOSFET), having a gate terminal connected with the ground terminal, a source terminal connected with the at least one fifth transistor and a drain terminal connected with the third diode.

41. The transmitter circuit with ringing suppression according to claim 38, wherein the third diode is a high-voltage (HV) diode, having an anode connected with the sixth transistor and a cathode connected with the first node and the CAN low voltage signal.

42. The transmitter circuit with ringing suppression according to claim 38, wherein the fourth diode is a high-voltage (HV) diode, having a cathode connected with the seventh transistor and an anode connected with the first node and the CAN low voltage signal.

43. The transmitter circuit with ringing suppression according to claim 38, wherein the seventh transistor is an N-type high-voltage (HV) Metal-oxide-semiconductor Field effect transistor (MOSFET), having a gate terminal connected with the power supply terminal, a source terminal connected with the at least one eighth transistor and a drain terminal connected with the fourth diode.

44. The transmitter circuit with ringing suppression according to claim 38, wherein the at least one eighth transistor is an N-type low-voltage (LV) Metal-oxide-semiconductor Field effect transistor (MOSFET), having a gate terminal connected with the second switch, a source terminal connected with the ground terminal and a drain terminal connected with the seventh transistor.

45. The transmitter circuit with ringing suppression according to claim 38, wherein the third operational amplifier has a positive terminal receiving the common mode voltage of the dominant state ($V_{CM\_DOM}$), a negative terminal coupled with a second node of the second output stage circuit, and an output terminal alternatively coupled with a positive terminal of the first operational amplifier or a positive terminal of the second operational amplifier; and wherein when the control signal (SIC_ON) is logically high, a voltage level of the first node in the first output stage circuit is equal to a voltage level of the second node in the second output stage circuit, such that the CAN high voltage signal, the CAN low voltage signal and the common mode voltage of the dominant state ($V_{CM\_DOM}$) are equal.

46. The transmitter circuit with ringing suppression according to claim 23, wherein the first operational transconductance amplifier further comprises a plurality of the fifth transistors and a plurality of the first switches, each of the fifth transistors is disposed corresponding to each of the first switches, and the plurality of the fifth transistors are turned on sequentially according to the plurality of the first switches so as to reduce a glitch of the CAN high voltage signal and the CAN low voltage signal.

47. The transmitter circuit with ringing suppression according to claim 23, wherein the first operational transconductance amplifier further comprises a plurality of the eighth transistors and a plurality of the second switches, each of the eighth transistors is disposed corresponding to each of the second switches, and the plurality of the eighth transistors are turned on sequentially according to the plurality of the second switches so as to reduce a glitch of the CAN high voltage signal and the CAN low voltage signal.

48. The transmitter circuit with ringing suppression according to claim 38, wherein the second operational transconductance amplifier further comprises a plurality of the fifth transistors and a plurality of the first switches, each of the fifth transistors is disposed corresponding to each of the first switches, and the plurality of the fifth transistors are turned on sequentially according to the plurality of the first switches so as to reduce a glitch of the CAN high voltage signal and the CAN low voltage signal.

49. The transmitter circuit with ringing suppression according to claim 38, wherein the second operational transconductance amplifier further comprises a plurality of the eighth transistors and a plurality of the second switches, each of the eighth transistors is disposed corresponding to each of the second switches, and the plurality of the eighth transistors are turned on sequentially according to the plurality of the second switches so as to reduce a glitch of the CAN high voltage signal and the CAN low voltage signal.

50. The transmitter circuit with ringing suppression according to claim 9, wherein the CAN bus driver stage further comprises a plurality of the first transistors which are connected in cascade, the plurality of the first transistors are electrically connected with the slew control circuit such that the plurality of the first transistors are sequentially turned on by the slew control circuit so as to reduce a glitch of the CAN high voltage signal and the CAN low voltage signal.

51. The transmitter circuit with ringing suppression according to claim 9, wherein the CAN bus driver stage further comprises a plurality of the third transistors which are connected in cascade, the plurality of the third transistors are electrically connected with the slew control circuit such that the plurality of the third transistors are sequentially turned on by the slew control circuit so as to reduce a glitch of the CAN high voltage signal and the CAN low voltage signal.

52. The transmitter circuit with ringing suppression according to claim 1, wherein the common mode voltage is alternatively generated by a reference voltage generator, or by a replica circuit of the CAN bus driver stage.

* * * * *